(12) United States Patent
Miyazawa et al.

(10) Patent No.: US 7,027,369 B1
(45) Date of Patent: Apr. 11, 2006

(54) OPTICAL PICKUP APPARATUS FOR SIMULTANEOUSLY READING DATA FROM A PLURALITY OF TRACKS OF AN OPTICAL DISC

(75) Inventors: Hiroshi Miyazawa, Tokorozawa (JP); Hidemi Tachizawa, Fuchu (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/486,116

(22) PCT Filed: Aug. 11, 1998

(86) PCT No.: PCT/JP98/03573
§ 371 (c)(1),
(2), (4) Date: Feb. 18, 2000

(87) PCT Pub. No.: WO99/09552
PCT Pub. Date: Feb. 25, 1999

(30) Foreign Application Priority Data

Aug. 19, 1997 (JP) .................................. 9-236475
Aug. 26, 1997 (JP) .................................. 9-243481
Sep. 22, 1997 (JP) .................................. 9-273368

(51) Int. Cl.
*G11B 7/09* (2006.01)
*G11B 7/14* (2006.01)

(52) U.S. Cl. ............................... 369/44.37; 369/44.41; 359/318; 359/319

(58) Field of Classification Search ............. 369/44.37, 369/112.29, 120, 44.14, 44.41, 112.23; 359/318, 359/319
See application file for complete search history.

(56) References Cited

U.S. PATENT DOCUMENTS 4,574,371 A * 3/1986 Takemura et al. .......... 369/100
5,018,127 A * 5/1991 Ando .................... 369/112.09

(Continued)

FOREIGN PATENT DOCUMENTS

EP  0 147 006  7/1985
EP  0 316 959  5/1989

(Continued)

OTHER PUBLICATIONS

Examiner's Refusal Decision, Japanese Patent Office, Aug. 26, 2003.

(Continued)

*Primary Examiner*—Gautam R. Patel
(74) *Attorney, Agent, or Firm*—Eric J. Robinson; Robinson Intellectual Property Law Office, P.C.

(57) ABSTRACT

An optical pickup apparatus (10) for reading data from a plurality of tracks of an optical disc (34) at the same time by focussing spots (M, . . . ) of each light beam on a plurality of tracks, passing the reflected light beams of spots (M, . . . ) sequentially through an objective lens (30), a collimator lens (28), and a focus adjusting lens (50) in this order, and detecting the reflected light beams with photodiodes (52M, . . . ) disposed along a photodiode light reception plane (68). In order to make each reflected light become incident upon each photodiode (52M, . . . ), a case (72) and a bracket (78) are separated from a chassis (70), and support the focus adjusting lens (50) and the photodiodes (52M, . . . ) respectively. The case (72) and bracket (78) are made so that they can be fixed to the chassis (70) at optional positions in a predetermined area along a direction of the optical axis (66). While the case (72) and bracket (78) are moved along the optical axis (66) direction, positions along the optical axis (66) where the reflected light beams are allowed to enter the photodiodes (52M, . . . ) are searched and the case (72) and bracket (78) are fixed to the chassis (70) at the searched positions.

25 Claims, 15 Drawing Sheets

U.S. PATENT DOCUMENTS

| | | | |
|---|---|---|---|
| 5,023,845 A * | 6/1991 | Crane et al. .................. 73/800 |
| 5,497,366 A | 3/1996 | Fujisawa |
| 5,526,340 A * | 6/1996 | Tanaka ....................... 369/219 |
| 5,581,533 A * | 12/1996 | Fujisawa ............... 369/112.23 |
| 5,619,482 A * | 4/1997 | Tezuka et al. ........... 369/44.23 |
| 5,687,155 A * | 11/1997 | Fukakusa et al. ...... 369/112.06 |
| 5,699,340 A * | 12/1997 | Lee et al. ................ 369/53.19 |
| 6,052,357 A * | 4/2000 | Ogawa et al. .............. 369/215 |
| 6,172,958 B1 * | 1/2001 | Mochizuki et al. ...... 369/44.37 |

FOREIGN PATENT DOCUMENTS

| | | |
|---|---|---|
| JP | 63-193215 | 12/1988 |
| JP | 01-097413 | 6/1989 |
| JP | 02-089236 | 3/1990 |
| JP | 03-141045 | 6/1991 |
| JP | 05-290405 | 11/1993 |
| JP | 05-325217 | 12/1993 |
| JP | 07-235060 | 9/1995 |

OTHER PUBLICATIONS

Examiner's Refusal Decision, Patent Application No. 236475/1997, Japanese Patent Office, Aug. 18, 2003.

JP 03-093049 Apr. 18, 1991, abstract only.

English translation of Office Action from the Japanese Patent Office, mailed Nov. 5, 2002, in JP Patent Application No. 09-273368.

* cited by examiner

OPTICAL PICKUP APPARATUS FOR SIMULTANEOUSLY READING DATA FROM A PLURALITY OF TRACKS OF AN OPTICAL DISC

BACKGROUND OF THE INVENTION

1. Field of the Invention

The present invention relates to an optical pickup apparatus for detecting a light spot reflected from a record track to read data recorded on the record track of a recording medium such as an optical disc and a card, and to a method of manufacturing such an optical pickup apparatus, and more particularly to an optical pickup apparatus for applying light spots to a plurality of tracks and reading data recorded on the tracks and to a method of manufacturing such an optical pickup apparatus.

The present invention also relates to an optical pickup apparatus to be used with a CD player or the like, a holder for holding a photodetector which is a component of the optical pickup apparatus, and a method of manufacturing such an optical pickup apparatus, and more particularly to an optical pickup apparatus, a holder, and a method of manufacturing the optical pickup apparatus, all of which facilitate the manufacture of the optical pickup apparatus.

2. Description of the Related Art

In an optical pickup apparatus for reading data recorded on a recording medium such as an optical disc and a card, a light beam is focussed on a track of the recording medium and the light beam reflected from the tack is detected with a photodetector.

Another type of an optical pickup apparatus has been proposed in which a plurality of light beams, e.g., seven light beams, are generated and corresponding seven spots are focussed on tracks of a recording medium to read data recorded on the tracks at the same time. With such a conventional optical pickup apparatus, light from a laser source is applied to a diffraction grating as light beam separation means to generate a plurality of light beams. These light beams are passed through a collimator lens and an objective lens and focussed on tracks of a recording medium in the form of light spots. Light spots reflected from the tracks are passed through the objective lens and collimator lens in the optical path opposite to the incoming optical path and through a focus adjusting lens, and are made incident upon photodiodes disposed, for example, along a direction perpendicular to the optical axis at a predetermined pitch corresponding to the reflected light spots. With the conventional optical pickup apparatus, each photodiode is directly mounted on a chassis at a predetermined photodiode mount position so as to make the reflected light beam passed through the focus adjusting lens become incident upon a corresponding photodiode.

In Japanese Laid-open Patent Application No. 8-221774, five light beams are generated and focussed upon tracks of a recording medium, and the light spots reflected from the tracks are detected. A single main spot is used for reading data recorded on the track, and other four spots are subsidiary spots which are used for servo tracking and are not used for reading data.

There are manufacture variations of laser oscillation frequencies and spaces between cells of lattice gratings. These variations affect a distribution pitch of reflected light beams along a direction perpendicular to an optical axis, so that the reflected light beam may not become incident upon the corresponding photodiode. A manufacture variation of ratios of focal lengths of collimator lenses to total focal lengths of collimator lenses and focus adjusting lenses may also affect the pitch between reflected light beams along a direction perpendicular to the optical axis. Specifically, with a conventional optical pickup apparatus, in order to compensate for the variation of pitches between reflected light beams along the direction perpendicular to the optical axis, the light reception area is made larger the farther the photodiode is positioned from the optical axis along the direction perpendicular to the optical axis. An increase in the light reception area of the photodiode results in poor frequency response characteristics (a lower high-cut frequency) of the photodiode and may degrade the apparatus performance.

In a conventional optical pickup apparatus used with a CD player or the like, a single light spot is used for reading data recorded on a CD. A single light beam from a light source is applied to a triangular prism to change its direction generally by a right angle, and passed through an objective lens to form a light spot on a track of CD. The reflected light beam is detected with a photodetector. The triangular prism is fixed to a chassis at a predetermined position by using predetermined positioning means such as a stopper.

Another optical pickup apparatus has been proposed in which a plurality of light beams, e.g., seven light beams, are generated and corresponding seven spots are focussed on tracks of a recording medium to read data recorded on the tracks at the same time.

In correctly focussing a plurality of spots on corresponding tracks of a recording medium and reliably detecting all the reflected spots and reading data, it is necessary for all the spots to enter an effective area of the objective lens projected upon respective tracks. In forming a plurality of spots on corresponding tracks, some spots may not enter the effective area of the objective lens projected upon respective tracks, because of work precision errors, dimension errors and mount errors of each component of the optical pickup apparatus. If a direction of a light beam is inclined relative to the track surface because of mount errors of an optical element, the focussing state of each spot may become inconsistent and unbalanced.

FIG. 28 shows a conventional holder 216 mounted on a base 212 of an optical pickup apparatus 210. The base 212 has a holder mount surface 214. The holder 216 of a block structure having a predetermined thickness has a bonding surface 240 and a non-bonding surface 242. The bonding surface 240 is adhered to the holder mount surface 214. A light reception unit receptacle 218 is formed in the central area of the non-bonding surface 218. A circular window 220 is formed on the bottom of the light reception unit 218 for passing a laser beam from a circular window 236 (FIG. 30) formed on the holder mount surface 214 side through this circular window 220. Pin fitting V-grooves 222 are formed through the whole thickness of the holder 216 on the right and left sides of the holder 216. A light reception unit 224 includes photodetectors or the like and has a shape and size conformal to the light reception unit receptacle 218 so that the former can be fitted in and mounted on the latter. A flexible print circuit (FPC) 226 is attached to the outer side surface of the light reception unit 224.

FIG. 29 illustrates a preliminary mount process for mounting the conventional holder 216 on the base 212. The horizontal and vertical directions are represented by x and y. The holder mount surface 214 is parallel to the x-y plane. The direction perpendicular to the x-direction is represented by z, and is perpendicular to the holder mount surface 214. An adjusting pin holder 254 has a pair of adjusting pins 256 extending along the z-direction and having tapered sharp ends. The adjusting pin holder 254 is movable along the x-, y- and z-directions. The adjusting pin holder 254 is moved first in the z-direction toward the non-bonding surface 242 of the holder 216 to partially insert the adjusting pins 256 into the pin adjusting V-grooves 222, and thereafter moved in the x- and y-directions to move the holder 216 in the x- and y-directions relative to the base 212 until a light reception plane of the light reception unit 224 reaches the optical axis of the laser beam supplied from the circular window 236 (FIG. 31) of the base 212. Next, instant adhesive 270 (FIG. 32) is dropped to two areas 266 on the upper side of the holder 216 to adhere the holder 216 to the holder mount surface 214 for the preliminary mount of the holder 216. Thereafter, the adjusting pin holder 254 is moved in the z-direction to be retracted from the base 212 so that the adjusting pins 256 are removed from the pin fitting V-grooves 222.

FIG. 30 shows another conventional holder 230 mounted on a base 212 of a conventional optical pickup apparatus 210. The main structure will be described. The holder 230 has a gate portion 232 which is floated over a holder mount surface 214. A light reception unit receptacle 218 is formed in the gate portion 232. A preliminary mount of the holder 230 on the base 212 is similar to that described with reference to FIG. 29. The tapered sharp ends of the adjusting pins 256 of the adjusting pin holder 254 are fitted into pin fitting V-grooves 222.

FIG. 31 shows another conventional holder 238 before it is mounted on a base 212 of an optical pickup apparatus 210. A circular hole 236 is formed in the base 212 on the holder mount surface 214 side, from which hole a laser beam is output to a light reception unit 224. The holder 238 has upper and lower projections extending to right and left sides thereof. These right and left projections are formed with idle holes 244 and pin holes 246 extending through the whole thickness of the holder 238. A pusher plate spring 248 is formed with recesses 250 and screw insertion holes 252 at positions corresponding to the pin holes 246 and idle holes 244 of the holder 238. A convex portion of the plate spring 248 is projected toward the bonding surface 240, and an apex of the convex portion abuts on the non-bonding surface 242 of the holder 216. The adjusting pin holder 254 is moved first to insert the adjusting pins 256 into the recesses 250 and partially insert the ends of the pins into the pin holes 246 of the holder, and then moved in the x- and y-directions. When the light reception plane of the light reception unit 224 reaches the optical axis of a laser beam supplied from the circular window 236, the holder 238 is stopped relative to the base 212. Thereafter, as shown in FIG. 29, the instant adhesive 270 is dropped to the two areas 266 to preliminary adhere the bonding surface 240 of the holder 238 to the holder mount surface 214. Lastly, fastening screws are inserted into the screw insertion holes 252 and idle holes 244 and threaded into screw holes 260 on both sides of the holder mount surface 214 to thereby fix the holder 238 to the holder mount surface 214. The size of the screw insertion hole 252 is set so that the holder 238 can be moved in the x- and y-directions relative to the holder mount surface 214 to determine the final mount positions by using the adjusting pins 256.

FIG. 32 illustrates an invasion of the instant adhesive into the pin fitting V-grooves 222 immediately after the holder 216 shown in FIG. 28 is preliminarily mounted. The tapered sharp ends of the adjusting pins 256 abut on the side edges of the pin fitting v-grooves 222 so that the pins are prevented from entering further the V-grooves and the tapered sharp ends are prevented from abutting on the holder mount surface 214.

Referring to FIG. 32, the instant adhesive 270 dropped to the two areas 266 (FIG. 29) flows into a gap between the holder mount surface 214 of the base 212 and the bonding surface 240 of the holder 240 and invades into the pin fitting V-grooves 222. The instant adhesive 270 then rises and invades into a space between the tapered sharp ends of the adjusting pins and the side walls of the holder 216 through capillarity. After the instant adhesive 270 is dropped to the two areas 266, the adjusting pins 256 is retracted from the holder 216 and pulled out of the pin fitting V-grooves 222. However, as shown in FIG. 32, the instant adhesive 270 invaded into the pin fitting V-grooves may be attached and adhered to the tapered sharp ends of the adjusting pins 256. In this case, when the adjusting pins 256 are pulled out of the pin fitting V-grooves 222, the holder 216 preliminarily mounted once on the holder mount surface 224 may be peeled off from the holder mount surface 214.

SUMMARY OF THE INVENTION

It is an object of the present invention to provide an optical pickup apparatus and its manufacture method capable of solving the above problems.

It is another object of the present invention to provide an optical pickup apparatus, its holder, and its manufacture method capable of preventing adjusting pins from being adhered to adhesive during preliminary mount.

An optical pickup apparatus of this invention comprises: (a) objective spot forming means for forming each spot of a plurality of light beams entered via a collimator, on each track of a recording medium; (b) a plurality of photodetectors each provided for each spot for receiving reflected light of each spot, the reflected light having passed through the objective spot forming means, the collimator, and focus adjusting means in this order; and (c) a chassis mounted with the collimator, wherein the focus adjusting means and the plurality of photodetectors are supported respectively by a focus adjusting means support member and a photodetector support member formed separately from the chassis, and the focus adjusting means support member and the photodetector support member are fixed to the chassis at positions along an optical axis, the positions being visually confirmed that the reflected light of each spot becomes incident upon a corresponding one of the photodetectors.

The visual confirmation that the reflected light of each spot becomes incident upon a corresponding one of the photodetectors, can be made through judgement of a displayed image of the positions of the reflected light beams picked up with a CCD disposed along the optical axis direction. The recording medium includes those media whose data is optically read, for example, an optical disc such as a CD and a card. The objective spot forming means, collimator, and focus adjusting means include optical elements other than lenses.

A pitch between the reflected light beams of each spot focussed by the focus adjusting means on the photodetectors and disposed along the direction perpendicular to the optical axis changes with each optical pickup apparatus, because of manufacture variations. The manufacture variations include variations of oscillation frequencies of lasers, distances between cells of diffraction gratings, and ratios of focal lengths of collimators to total focal lengths of collimators and focus adjusting means. However, with this optical pickup apparatus, the focus adjusting means support member and photodetector support member are formed discretely from the chassis movably along the optical axis direction, and fixed to the chassis at the positions along the optical axis direction, the positions being visually confirmed that the reflected light of each spot becomes incident upon a corresponding one of the photodetectors. Accordingly, each reflected light beam becomes correctly incident upon the corresponding one of the photodetectors, so that the light reception area of each photodetector can be reduced and the frequency characteristics can be improved.

In the optical pickup apparatus of this invention, the plurality of light beams are generated by making light from a light source pass through a diffraction grating.

Since a plurality of light beams can be generated by a single light source, it is cost effective. Since the spots of light beams are aligned generally in line on a recording medium, reflected light beams focussed by the focussing means upon the photodetectors are aligned generally in line along a direction perpendicular to the optical axis and a pitch between reflected light beams changes linearly with a motion change along the optical axis. Accordingly, by displacing the photodetector support member along the optical axis, it is easy to search the positions along the optical axis, the positions allowing the reflected light of each spot to become incident upon a corresponding one of the photodetectors previously disposed at an equal pitch along a direction perpendicular to the optical axis.

In the optical pickup apparatus of this invention, at least one of the plurality of photodetectors includes a plurality of light reception areas for divisionally receiving one light beam.

The pitch and positions of reflected light beams along a direction perpendicular to the optical axis regularly change with a position of the photodetectors along the optical axis. Accordingly, if at least one photodetector is made of a plurality of light reception areas for divisionally receiving one reflected light beam (e.g., if a photodetector on the optical axis is divided into four areas A, B, C, and D) and it is checked whether the reflected light is correctly incident upon each of the four light reception areas, then it is not necessary to check whether the reflected light is incident upon each of the other photodetectors disposed in line.

In a method of manufacturing an optical pickup apparatus having objective spot forming means for forming each spot of a plurality of light beams entered via a collimator, on each track of a recording medium, a plurality of photodetectors each provided for each spot for receiving reflected light of each spot, the reflected light having passed through the objective spot forming means, the collimator, and focus adjusting means in this order, and a chassis mounted with the collimator, the method of this invention comprises the steps of: changing a first distance along an optical axis direction between the collimator and the focus adjusting means and a second distance along the optical axis direction between the collimator and the photodetectors; searching the first and second distances along the optical axis direction which allow the reflected light of each of the spots become incident upon a corresponding one of the photodetectors; and fixing the focus adjusting means and the photodetectors to the chassis at the searched first and second distances along the optical axis direction.

A pitch between the reflected light beams of each spot generated by the objective lens forming means and focussed by the focus adjusting means on the photodetectors changes with each optical pickup apparatus, because of manufacture variations. The manufacture variations include variations of oscillation frequencies of lasers, distances between cells of diffraction gratings, and ratios of focal lengths of collimators to total focal lengths of collimators and focus adjusting means. However, with this method of manufacturing an optical pickup apparatus, the photodetector support member and the focus adjusting means support member are moved along the optical axis and fixed to the chassis at the positions along the optical axis, the positions allowing the reflected light of each spot to become correctly incident upon a corresponding one of the photodetectors. Accordingly, the manufacture variations can be compensated and each reflected beam can be correctly made incident upon the corresponding photodetector.

In the method of manufacturing an optical pickup apparatus of this invention, changing the first and second distances along the optical axis direction is performed while a predetermined relation between the first and second distances is maintained.

Each reflected light beam transmits at a predetermined angle relative to the optical axis. Therefore, a distance between a reference point to the focus adjusting means along the optical axis and a distance between the reference point to the photodetectors along the optical axis has a predetermined relation when the reflected light emitted from the focus adjusting means becomes correctly incident upon the corresponding photodetector. While maintaining this relation, the focus adjusting means support member and photodetector support member are moved so that the positions of the focus adjusting means and photodetectors along the optical axis can be effectively searched, the positions allowing the reflected light of each spot to become correctly incident upon a corresponding one of the photodetectors.

An optical pickup apparatus of this invention comprises: (a) a light reflection optical element for reflecting a plurality of light beams incoming along a direction of a first axial line, toward a direction of a second axial line different from the first axial line; (b) spot forming means for forming a spot of each light beam incoming along the direction of the second axial line from the light reflection optical element, on each track of a recording medium; (c) support means for rotatably supporting the light reflection optical element about at least one rotation axial line on a chassis, the rotation axial line passing a reference point which is a cross point between the first and second axial lines; (d) fixing means for fixing the light reflection optical element to the chassis at the rotary position allowing the spots on a recording medium to enter the effective area of the spot forming means, and/or allowing the focus states of the spots to become generally equal; and (e) reflected light detecting means for detecting reflected light of each spot passed through the spot forming means.

The recording medium includes those media whose data on a track is optically read, for example, an optical disc such as a CD and a card. The spot forming means includes optical elements other than convex and concave lenses, such as a Fresnel element. Two steps of preliminary and final mounts may be used for fixing the light reflection optical element to the chassis by the fixing means. The effective area for the spot forming means is an area of a recording medium in which spots capable of being read correctly are formed on tracks.

As the rotary position of the light reflection optical element is changed about a rotation axial line, the positions of the spots on a recording medium change and/or the directions of the light beams relative to the recording medium change, so that the focus state of each spot changes. The rotary position of the light reflection optical element is adjusted so as to allow all the spots to enter the effective area of the spot forming means and/or so as to make the size of each spot on a track of the recording medium generally equal, and thereafter the light reflection optical element is fixed to the chassis by the fixing means. Accordingly, irrespective of the size error of each component of the optical pickup apparatus, the spots can be entered into the effective area of the spot forming means and/or the size of each spot can be made generally equal.

In the optical pickup apparatus of this invention, the rotation axial line includes a rotation axial line perpendicular to both the first axial line and the second axial line.

In the optical pickup apparatus of this invention, the rotation axial line includes a rotation axial line coincident with the first axial line.

In the optical pickup apparatus of this invention, the rotation axial line includes a rotation axial line coincident with the second axial line.

As the rotary position of the light reflection optical element is changed about a rotation axial line perpendicular to both the first and second axial lines, a rotation axial line coincident with the first axial line, and/or a rotation axial line coincident with the second axial line, the positions of the spots on a recording medium change and/or the directions of the light beams relative to the recording medium change, so that the focus state of each spot changes. The rotary position of the light reflection optical element is adjusted so as to allow all the spots enter the effective area of the spot forming means and/or so as to make the size of each spot on a track of the recording medium generally equal, and thereafter the light reflection optical element is fixed to the chassis by the fixing means. Accordingly, irrespective of the size error of each component of the optical pickup apparatus, the spots can be entered the effective area of the spot forming means and/or the size of each spot can be made generally equal.

In the optical pickup apparatus of this invention, the support means includes a spherical fitting portion. The spherical fitting portion makes the light reflection optical element freely rotate about an optional rotation axial line, so that the rotary position of the light reflection optical element can be changed about a rotation axial line perpendicular to both the first and second axial lines, a rotation axial line coincident with the first axial line, and/or a rotation axial line coincident with the second axial line. Accordingly, it is not necessary to provide the support means for each of the rotation axial lines about which the light reflection optical element rotates, and the structure of the support means can be simplified.

An optical pickup apparatus of this invention comprises: (a) a light reflection optical element for reflecting a plurality of light beams incoming along a direction of a first axial line, toward a direction of a second axial line different from the first axial line; (b) spot forming means for forming a spot of each light beam incoming along the direction of the second axial line from the light reflection optical element, on each track of a recording medium; (c) support means for movably supporting the light reflection optical element on the chassis along the direction of the first axial lie and/or the direction of the second axial line; (d) fixing means for fixing the light reflection optical element to the chassis after the position of the light reflection optical element is adjusted along the first or second axial line so as to allow the spots on a recording medium to enter the effective area of the spot forming means, and (e) reflected light detecting means for detecting reflected light of each spot passed through the spot forming means.

As the position of the light reflection optical element is changed along the first or second axial line, the positions of the spots on a recording medium change. After the position of the light reflection optical element is adjusted along the first or second axial line so as to allow all the spots to enter the effective area of the spot forming means, it is fixed to the chassis by the fixing means. Accordingly, irrespective of the size, work, and assembly errors of each component of the optical pickup apparatus, the spots can be correctly entered into the effective area of the spot forming means.

An optical pickup apparatus of this invention has a photodiode unit mounted on a holder having a bonding surface bonded to a holder mount surface of a base and a position adjusting pin receptacle for receiving a position adjusting pin, the holder being bonded to the base after the holder is aligned with a proper position by the position adjusting pin, wherein the holder has a shielding portion for shielding the holder mount surface from the position adjusting pin receptacle.

A portion of preliminary mount adhesive dropped to a preliminary mount adhesive area flows in between the holder mount surface of the base and the bonding surface of the holder, and toward the position adjusting pin receptacle. However, the shielding portion shields the holder mount surface from the position adjusting pin receptacle. It is therefore possible to prevent the preliminary adhesive from invading into the position adjusting pin and therefore from attaching to the position adjusting pin in the position adjusting pin receptacle. Accordingly, the position adjusting pin is prevented from being fixed to the position adjusting pin receptacle by the preliminary adhesive.

In the optical pickup apparatus of this invention, the position adjusting pin receptacle is a recess which is open on a side opposite to the holder mount surface and close on a side of the holder mount surface, and a close end of the recess constitutes the shielding portion.

The recess is closed on a side end of the holder mount surface. The preliminary mount adhesive is therefore prevented from invading into the recess, by the closed end of the recess, and the position adjusting pin can be prevented from being fixed to the recess by the preliminary adhesive.

In the optical pickup apparatus of this invention, the holder is provided with a projection projecting to a side opposite to the holder mount surface, and a recess being open at a top surface of the projection is formed in the projection.

If the thickness of the holder is small, it is difficult to provide the holder with the position adjusting pin receptacle and shielding portion. However, with this holder, a sufficient thickness is ensured so that the formation of the position adjusting pin receptacle and shielding portion becomes easy.

In the optical pickup apparatus of this invention, a projection projects from a surface on a side opposite to the bonding surface toward a side opposite to the holder mount surface, and a top circumference area of the position adjusting receptacle is inserted into an engaging hole of the position adjusting pin.

Since the top circumference area of the projection is inserted into the engaging hole of the position adjusting ping the pin can be received by the projection serving as the position adjusting pin receptacle, at the position sufficiently remote from the holder mount surface. Accordingly, the position adjusting pin can be prevented from being fixed by the preliminary adhesive during preliminary mount, and the formation of the position adjusting pin receptacle and shielding portion becomes easy.

In the optical pickup apparatus of this invention, a guide groove is formed on the bonding surface of the holder, the guide groove guiding preliminary adhesive from a preliminary mount adhesive dropping area to a direction different from a direction toward the position adjusting pin receptacle.

The preliminary adhesive dropped to the preliminary adhesive dropping area is guided by the guide groove so as not to flow toward the position adjusting pin receptacle. Accordingly, the position adjusting pin can be suppressed from being attached with the preliminary adhesive in the position adjusting pin receptacle.

A holder of this invention comprises: a plurality of position adjusting pin receptacles for receiving a plurality of position adjusting pins; a bonding surface bonded to a holder mount surface of a base; a mount for mounting a photodetector unit; and a shielding portion for shielding the holder mount surface from each of the position adjusting pin receptacles.

The shielding portion shields the holder mount surface from the position adjusting pin receptacle and suppresses the preliminary adhesive from invading into the position adjusting pin receptacle. Accordingly, the position adjusting pin can be prevented from being fixed to the position adjusting pin receptacle during preliminary mount of the holder on the base.

A holder of this invention comprises: a plurality of position adjusting pin receptacles for receiving a plurality of position adjusting pins; a bonding surface bonded to a holder mount surface of a base; a mount for mounting a photodetector unit; and a plurality of guide grooves for guiding preliminary adhesive from a preliminary adhesive dropping area to a direction different from a direction toward the position adjusting pin receptacles.

The guide groove guides the preliminary adhesive at the preliminary adhesive dropping area toward the area different from the position adjusting pin receptacle and suppresses it from flowing toward the position adjusting pin receptacle. Accordingly, the position adjusting pin can be prevented from being fixed to the position adjusting pin receptacle during preliminary mount of the holder on the base.

In a method of manufacturing an optical pickup apparatus having a photodiode unit mounted on a holder having a position adjusting pin receptacle and a shielding portion for shielding a holder mount surface of a base from the position adjusting pin receptacle, the method of this invention comprises the steps of: (a) aligning the holder with a proper position by using a position adjusting pin fitted in the position adjusting pin receptacle; (b) dropping preliminary adhesive down to a preliminary adhesive dropping area between the holder mount surface of the base and a bonding surface of the holder to preliminarily mount the holder on the base; and (c) removing the position adjusting pin from the position adjusting pin receptacle.

Since the shielding portion suppresses the preliminary adhesive from invading into the holder mount surface, the position adjusting pin can be suppressed from being fixed to the position adjusting pin receptacle by the preliminary adhesive. Accordingly, the pin can be detached from the holder mount surface without any practical problem.

A method of manufacturing an optical pickup apparatus having a photodiode unit mounted on a holder having a position adjusting pin receptacle and a guide groove for guiding preliminary adhesive from a preliminary mount adhesive dropping area to a direction different from a direction toward the position adjusting pin receptacle, the method of this invention comprises the steps of: (a) aligning the holder with a proper position by using a position adjusting pin fitted in the position adjusting pin receptacle; (b) dropping preliminary mount adhesive down to the preliminary mount adhesive dropping area between the holder mount surface of the base and a bonding surface of the holder to preliminarily mount the holder on the base; and (c) removing the position adjusting pin from the position adjusting pin receptacle.

Since the guide groove suppresses the preliminary adhesive at the preliminary adhesive dropping area from flowing toward the position adjusting pin receptacle, the position adjusting pin can be suppressed from being fixed to the position adjusting pin receptacle by the preliminary adhesive. Accordingly, the pin can be detached from the holder mount surface without any practical problem.

DETAILED DESCRIPTION OF THE PREFERRED EMBODIMENTS

Embodiments of the invention will be described with reference to the accompanying drawings.

Figure 2:
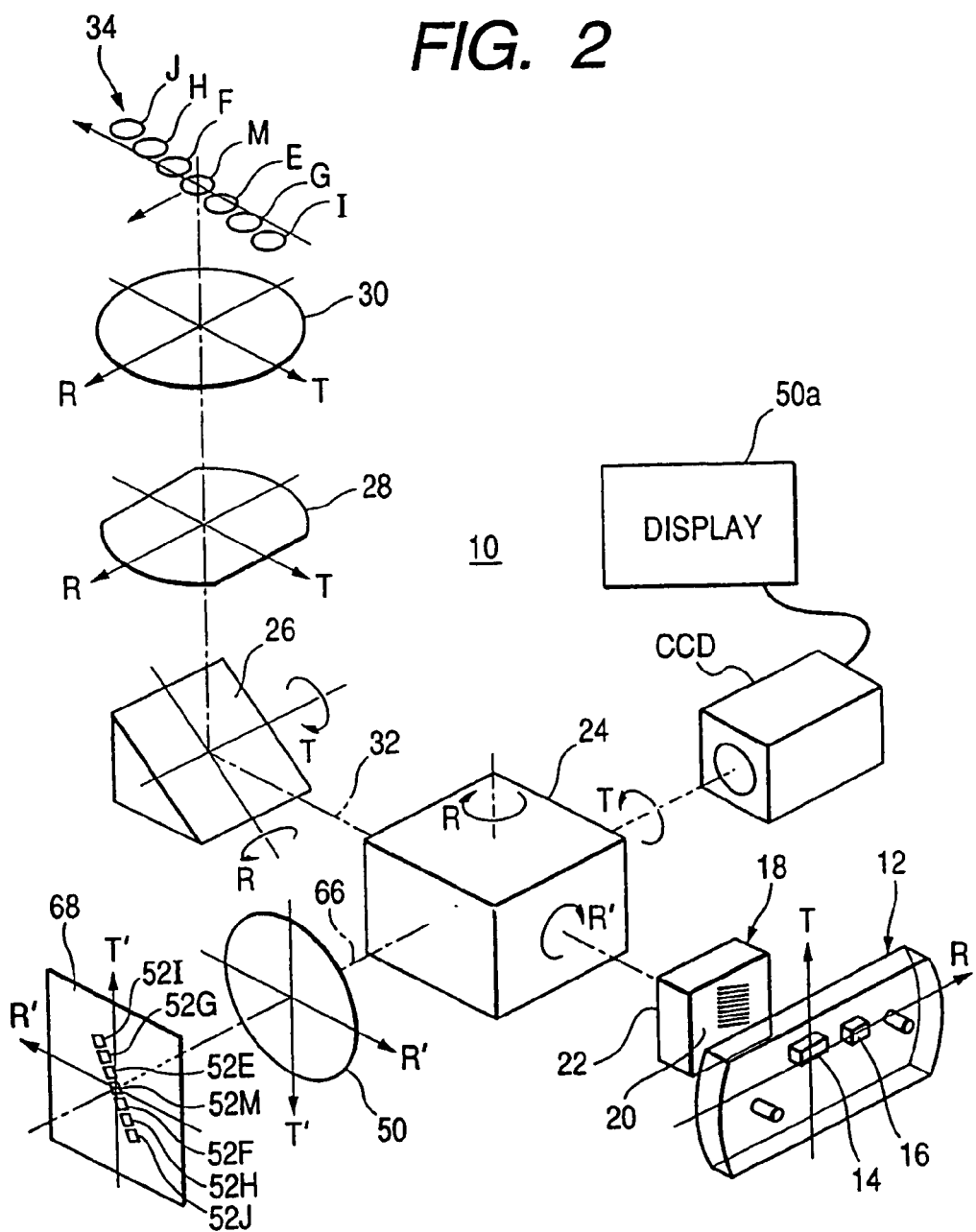
FIG. 2 illustrates optical paths of the optical pickup apparatus.

FIG. 2 illustrates optical paths of an optical pickup apparatus 10. In FIG. 2, an R direction and a T direction of an optical disc 34 is a radial direction of the optical disc 34 and a tangential direction of a track of the optical disc 34. The R direction is a direction toward the outer circumferential direction of the optical disc 34, and a reverse R direction is a direction toward the inner circumferential direction. The R and T directions given at each optical element indicate the motion directions of the optical element when a spot is moved to the R and T directions of the optical disc 34. R' and T' directions given at a photodiode light reception plane 68 correspond to the R direction and reverse T direction of the optical disc 34. R' and T' directions given at a beam splitter 24 and a focus adjusting lens 50 indicate the motion directions of the beam splitter 24 and focus adjusting lens 50 when a spot of reflected light is moved to the R' and T' directions of the photodiode photosensitive area 68.

A semiconductor laser 12 has a light emission unit 14 at the central area thereof, the light emission unit being a start of an optical axis 32 from the semiconductor laser 12 to the optical disc 34, and a photodiode unit 16 at an eccentric position spaced by a predetermined distance from the light emission unit 14 along the R direction. A hologram module 18 has a diffraction grating surface 20 on the semiconductor laser 12 side and a hologram surface 22 on the side opposite to the diffraction grating surface 20. A laser beam emitted from the light emission unit 14 is divided by the diffraction grating surface 20 of the hologram module 18 into seven light beams, one light beam on the optical axis 32 and three light beams on both sides of the one light beam. The diffraction grating is designed so that the intensity of the center light beam is 18% and that of each of the other light beams is about 11%, relative to the input light to the diffraction grating surface 20, and that the diffraction loss is about 16%. The seven light beams transmit straight through the beam splitter 24 and change their directions by 90° at a mirror 26. Thereafter, the seven light beams transmit sequentially through a collimator lens 28 and an objective lens 30 to form spots (M, E, F, G, H, I and J) in line generally along the T direction, on the optical disc 34 such as a CD. The spots (M to J) are disposed symmetrically with the center of the optical disc 34. Specifically, the spots E and F, G and H, and I and J are symmetrical with the center spot M on the optical axis 32. As will be later described, reflected light of the spot M is incident upon a photodiode 52M which is made of four photodiodes disposed in a 2×2 matrix, as different from the other photodiodes. These four photodiodes have respective photosensitive areas A, B, C and D (not shown) and obtain a servo signal based upon a received light intensity distribution to perform a tracking control for seven consecutive tracks in the R direction. The collimator lens 28 is not circular but generally ellipsoidal with both ends in the T direction being truncated along a straight line. The reason for this is as follows. Although the objective lens 30 is displaced in the R direction for the tracking control, it is not displaced in the T direction. In order to allow light to be incident upon the whole surface of the objective lens, therefore, the size in the R direction of the collimator lens 28 is required to match the displacement of the objective lens 30. However, such a requirement with respect to the T direction is not necessary because the objective lens 30 is not displaced in this direction. The opposite sides of the collimator lens 30 can therefore be truncated without any practical problem, so that the collimator lens 28 can be made compact.

An optical axis 66 has as its start the spot M, and along this optical axis 66 reflected light of the spots (M to J) is guided. The optical axis from the spot M to the beam splitter 24 is duplicated by the optical axis 32. More specifically, reflected light from the optical disc 34 passes sequentially through the objective lens 30 and collimator lens 28, is reflected by the mirror 26, applied to the beam splitter 24 to change its direction by 90°, and directed to the focus adjusting lens 50. The photodiode light reception plane 68 is defined by a plane inclusive of photodiodes 52 (M to J) disposed in line at a predetermined pitch along a direction perpendicular to the optical axis 66. The reflected light directed from the beam splitter 24 to the focus adjusting lens 50 passes through this lens and becomes incident upon the photodiodes 52 (M to J). The photodiode 52M on the optical axis is made of four photodiodes 52 (A, B, C and D) disposed in a 2×2 matrix in the R' and T' directions. The reflected light of the spot M is therefore distributed to these four photodiodes 52 (A, B, C and D). The reflected light incident upon the photodiodes 52 (A, B, C and D) is used not only for reading data on the track of the optical disc 34 but also for obtaining an error signal for tracking servo control through a DPD method.

A portion of the reflected light of the spot M is directed from the beam splitter 24 to the hologram module 18 whose hologram surface 22 changes the light direction toward the photodiode unit 18 to make the light be incident upon the photodiode unit 16. The reflected light incident upon the photodiode unit 16 is used for obtaining an error signal for focus servo control. In accordance with this error signal, the objective lens 30 is moved along the optical axis direction to set a distance to the optical disc 34 to a proper value.

There are manufacture variations of oscillation frequencies of semiconductor lasers 12, distances between cells of diffraction gratings, and the like. There is also a manufacture variation of ratios of focal lengths of collimator lenses 28 to total focal lengths of collimator lenses 28 and focus adjusting lenses 50. These variations may affect the pitch between reflected light beams on the photodiode light reception plane 68 and the reflected light beams may not become incident upon the photodiodes 52 (E, F, G, H, I and J) excepting the photodiode 52M. As will be later detailed, in order to solve this problem, the focus adjusting lens 50 and photodiode light reception plane 68 are moved along the optical axis direction 66 during the manufacture of the optical pickup apparatus 10 to search the correct positions along the optical axis direction so as to allow the reflected light beams to be correctly incident upon the photodiodes 52 (M to J). At this searched positions, the focus adjusting lens 50 and photodiode light reception plane 68 are fixed.

Figure 1A:
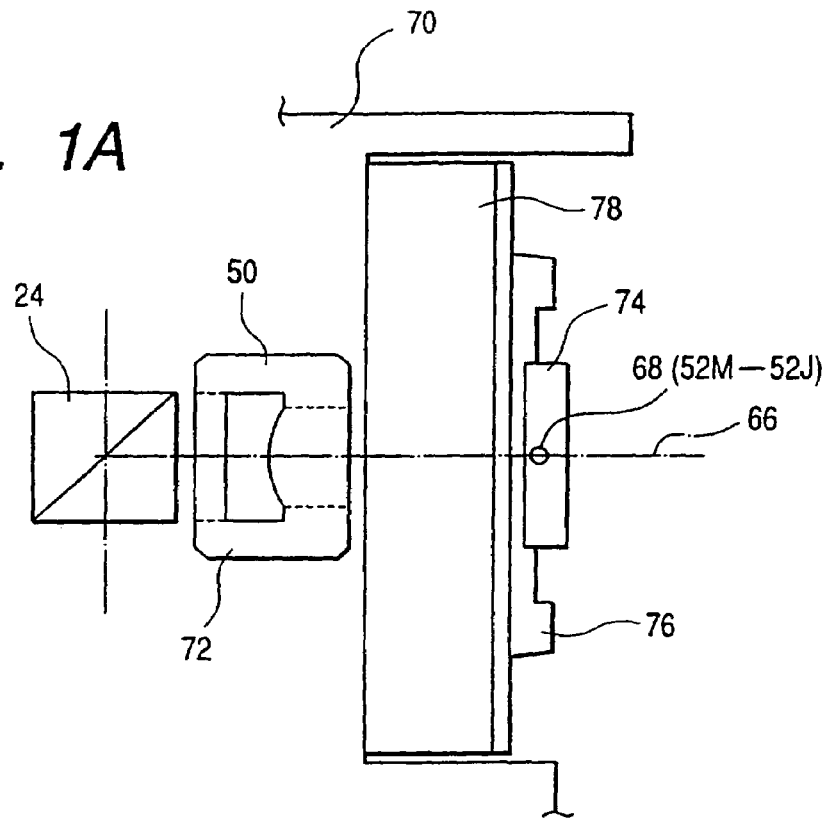
FIG. 1A is a schematic diagram showing the structure of an optical pickup apparatus in a range from a focus adjusting lens to a photodiode unit.
Figure 1B:
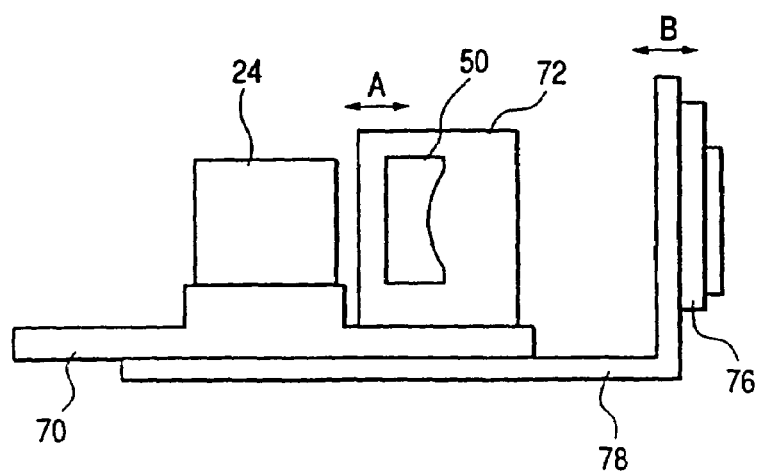
FIG. 1B is a schematic side view of the optical pickup apparatus shown in FIG. 1, illustrating that the focus adjusting lens is movable between the photodiode unit and a beam splitter of the optical pickup apparatus.

FIG. 1A shows the structure of the optical pickup apparatus 10 in a range from the focus adjusting lens 50 to the photodiodes 52 (M to J). The components of the optical pickup apparatus 10 such as the beam splitter 24 and collimator lens (FIG. 2) have predetermined positions on a chassis 70 at which they are fixed along the optical axis direction. In contrast, the positions of the focus adjusting lens 50 and photodiodes 52 (M to J) along the optical axis direction are adjusted and thereafter these components are fixed to the chassis 70. A case 72 is formed discretely from the chassis 70 and the focus adjusting lens 50 is fixed within the case 72. For the mount of the case 72 on the chassis 70, the case 72 is made movable in a predetermined range along the optical axis direction 66. The photodiodes 52 (M to J) are fixed in line at a predetermined pitch on a substrate 74. The photosensitive area of the photodiodes 52 (M to J) is positioned at the photodiode light reception plane 68. The substrate 74 is fixed to a holder 76. The peripheral area of the holder 76 is fixed to one surface of a bracket 78 of generally an L-character shape as viewed laterally, the other surface being fixed to the lower surface of the chassis 70. In this embodiment, the other surface is fixed to the lower surface of the chassis, but the other surface may be fixed to the upper surface. This state is schematically shown in FIG. 1B. As shown in FIG. 1B, the case 72 to which the focus adjusting lens 50 is fixed is adjusted between the photodiodes 52M–52J and beam splitter 24 by sliding the case 72 on the chassis 70 in the right and left directions as indicated by an arrow A with two heads. In addition, the photodiodes 52M–52J is adjusted by sliding the bracket 78 in the right and left directions as indicated by an arrow B with two heads in FIG. 1B.

In mounting the case 72 and bracket 78 on the chassis 70, a CCD is disposed on the side of the beam splitter 24 (FIG. 2) opposite to the focus adjusting lens 50, and the reflected light of the spots (M to J) on the holder mount plane (photodiode light reception plane 63) on the bracket 78 is detected with CCD and displayed on a display 50a. The case 72 and bracket 78 are moved along the optical axis 66 direction by using robots or the like. This motion of the case 72 and bracket 78 along the optical axis 66 direction is performed while a relation of y=a·x+b is maintained, because the distance between the collimator lens 28 and focus adjusting lens 50 along the optical axis direction and the distance between the collimator lens 28 and photodiode light reception plane 68 have a predetermined relation. In the relation of y=a·x+b, x is a distance between a reference point to the focus adjusting lens 50 along the optical axis 66 direction, the reference point being a surface point of the beam splitter 24 on the focus adjusting lens 50 side, y is a distance between the reference point to the photodiode light reception plane 68 along the optical axis 66 direction, and a and b are constants. While x is gradually increased from x=0, it is checked by using the display 50a whether the positions of the case 72 and bracket 78 along the optical axis direction are such that the reflected light beams are incident upon the photodiodes 52 (M to J) at the photodiode light reception plane 68. If these positions are determined, the case 72 and bracket 78 are preliminary or finally fixed to the chassis 70 at these positions with adhesive or the like. The positions of the photodiodes 52 (M to J) on the holder 76 are prefixed. Therefore, even if the holder 76 is not fixed to the bracket 78, the above check operation may be performed by displaying marks of the positions of the photodiodes 52 (M to J) on the holder 76 on the display 50a, and after the bracket 78 only is fixed to the chassis 70, the holder 76 is fixed to the bracket 78 by aligning the center of the holder 76 to the optical axis 66.

Figure 12:
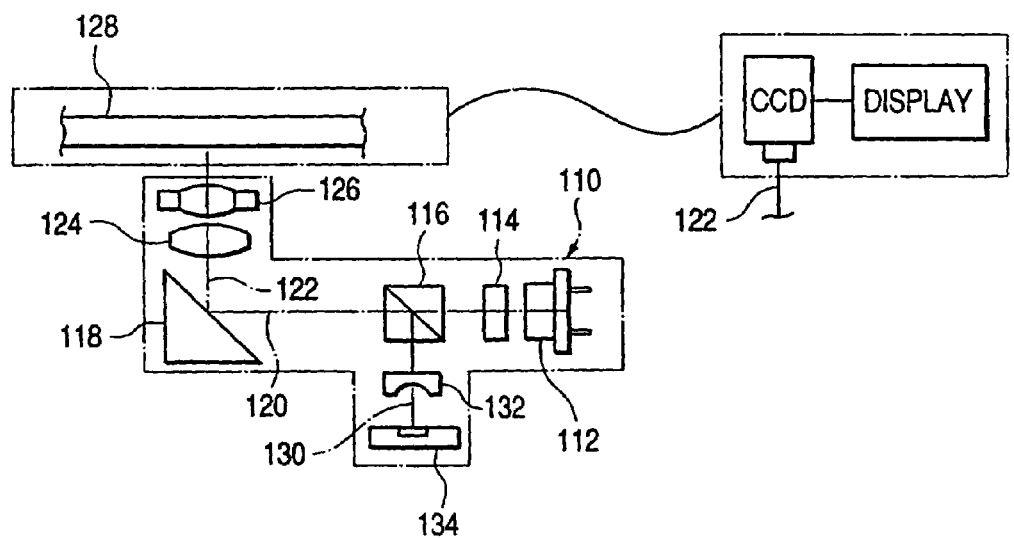
FIG. 12 is a schematic diagram of an optical pickup apparatus.

FIG. 12 is a schematic diagram showing an optical pickup apparatus 110. In this optical pickup apparatus 110, a semiconductor laser 112, a diffraction grating 114, and a beam splitter 116 are aligned on a first axial line 120. The first axial line 120 reaches a triangular prism 118, and a second axial line 122 extends from the triangular prism 118 at a right angle relative to the first axial line 120 and intersects with an optical disc 128 such as a CD-ROM generally perpendicularly. A collimator lens 124 and an objective lens 126 are aligned on the second axial line 122. A third axial line 130 extends from the beam splitter 116 at a right angle relative to the first axial line 120. A detector lens 132 and a photodetector unit 134 are aligned on this third axial line 130. A single light beam emitted from the semiconductor laser 112 passes through the diffraction grating 114 and divided into seven light beams disposed generally in line along a direction perpendicular to the first axial line 120. The center light beam among the seven light beams is generally along the first axial line 120. These seven light beams progress along the first axial line 120, pass through the beam splitter 116 toward the triangular prism 118. The seven light beams are reflected by the triangular prism 118, pass sequentially through the collimator lens 124 and objective lens, and are applied to the optical disc 128 as seven spots (M, E, F, G, H, I, and J). Reflected light from each spot (M to J) is applied along the reverse optical path to the objective lens 126, collimator lens 124 and triangular prism 118, and to the beam splitter 116 whereat the direction of the reflected light is changed by generally a right angle toward the detector lens 132. After passing through the detector lens 132, the reflected light reaches the photodetector unit 134.

Figure 3:
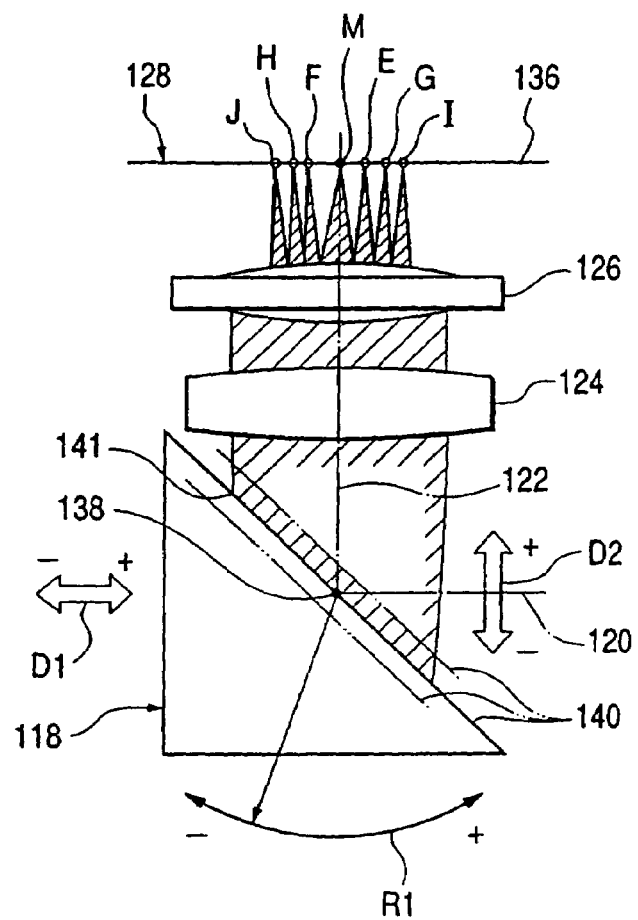
FIG. 3 is a detailed diagram showing the partial structure in a range from a triangular prism to an optical disc.

FIG. 3 is a detailed diagram of the optical pickup apparatus in a range from the triangular prism 118 to optical disc 128. Reference numeral 136 represents a pit surface of the optical disc 128. Seven light beams form on the pit surface 136 a spot M at the center, spots E, G, and I in this order from the center spot M on one side, and spots F, H, and J on the other side. Reflected light from these spots (I, G, E, M, F, H, and J) is supplied to the photodetector unit 134 (FIG. 12) to read data on a plurality of tracks 142 at the same time. The reference point 138 is a cross point between the first and second axial lines 120 and 122 as the center lines of the whole light beams. The light beam is reflected by a reflection surface 140 of the triangular prism 118. Reference numeral 141 represents a circular area of the reflection surface 140 on which the whole light beams become incident. D1 and D2 indicate the motion directions of the triangular prism 118 parallel to the first and second axial lines 120 and 122. As the triangular prism 118 is moved in the D1 and D2 +/− directions, the reflection surface 140 rises and falls as indicated by two-dot chain lines shown in FIG. 3. R1 indicates a rotation direction of the triangular prism 118 about the rotation axial line which is perpendicular to both the first and second axial lines 120 and 122 and passes through the reference point 138.

Figure 4:
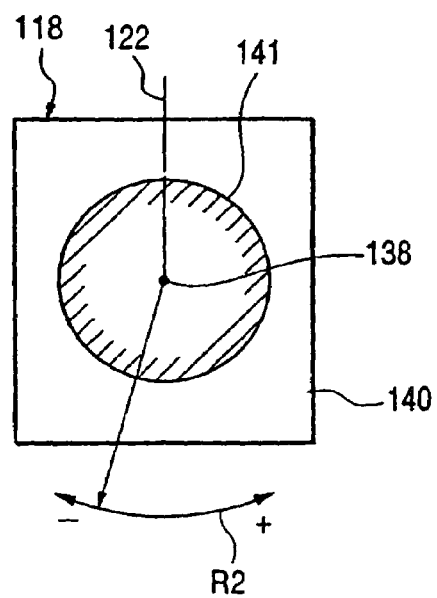
FIG. 4 shows the triangular prism as viewed from the right side in FIG. 3.

FIG. 4 shows the triangular prism 118 as viewed from the right side in FIG. 3. R2 indicates the rotation direction of the triangular prism 118 about the rotation axial line coincident with the first axial line 120.

Figure 5:
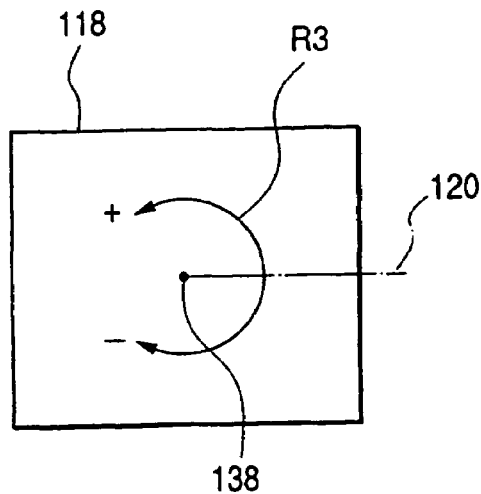
FIG. 5 shows the triangular prism as viewed from the bottom side in FIG. 3.

FIG. 5 shows the triangular prism 118 as viewed from the bottom side in FIG. 3. R3 indicates the rotation direction of the triangular prism 118 about the rotation axial line coincident with the second axial line 122.

Figure 6:
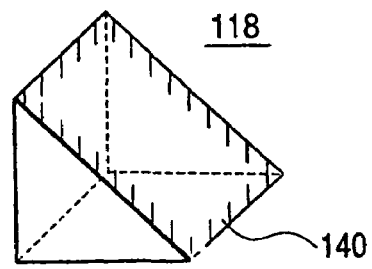
FIG. 6 is a perspective view of the triangular prism.

FIG. 6 is a perspective view of the triangular prism 118. The triangular prism 118 is a solid having a right angle isosceles triangle as its bottom surf ace, and the reflection surface 140 is a side surface including the slanted side of the bottom surface as one side thereof.

Figure 7:
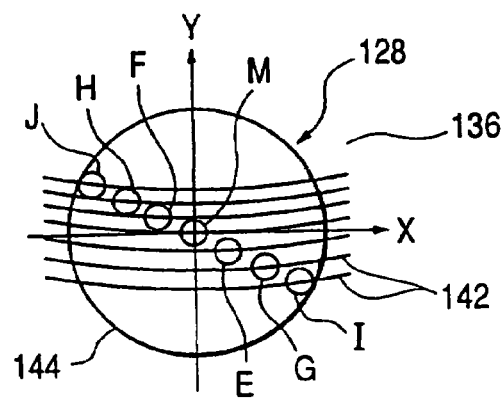
FIG. 7 shows positions of spots (M, E, F, G, H, I and J) on a pit surface as viewed from the top side in FIG. 3.

FIG. 7 shows the positions of the spots (I to J) on the pit surf ace 136 as viewed from the top side in FIG. 7. x indicates a tangential direction of the track 142 on the pit surf ace 136, and y indicates a radial direction (+direction toward the center of the optical disc 128), with the spot M being set to an origin. Tracks 142 are disposed at an equal pitch in the y-direction. The spots (I to J) are disposed obliquely relative to the x-direction and assigned the tracks starting from the inner side track.

Figure 8:
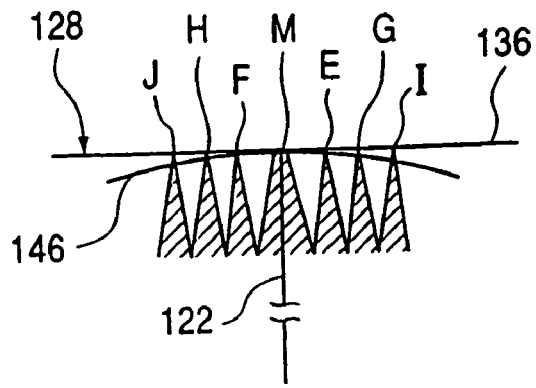
FIG. 8 is a diagram showing a convergence state of each light beam toward the pit surface of an optical disc.

FIG. 8 illustrates a convergence state of each light beam toward the pit surface 136 of the optical disc 128. Reference numeral 146 represents a circle having the principal point of the objective lens 126 (FIG. 3) as its center and the focal length of the objective lens 126 as its radius. The focus servo control is performed so as to make the circle 146 in contact with the pit surface 136 at the cross point with the second axial line 122. The distance between the pit surface 136 to the circle 146 is not the same in the column direction of the spots (I to J) and changes.

Figure 9:
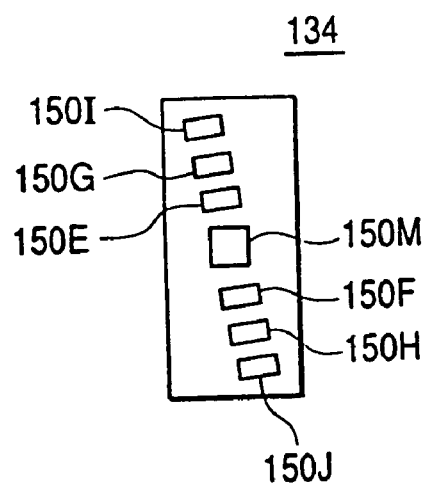
FIG. 9 is a detailed diagram of a photodetector unit.

FIG. 9 is a detailed diagram of the photodetector unit 134. Photodetectors 150 (I to J) correspond to the spots (I to J) on the pit surface 136 shown in FIG. 7 and receive the reflected light beams of the spots (I to J) via an optical path from the objective lens 126 to the collimator lens 124, second axial line 122, beam splitter 116 and to the detector lens 132 as shown in FIG. 12.

Figure 10:
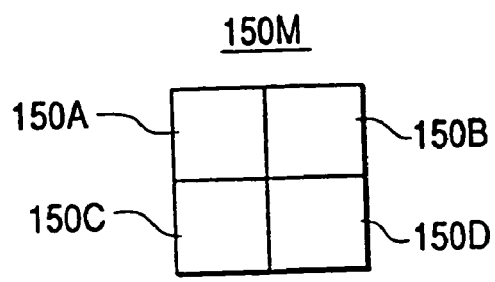
FIG. 10 is a detailed diagram of photodetectors shown in FIG. 9.

FIG. 10 is a detailed diagram of the photodetector 150M shown in FIG. 9. This optical pickup apparatus 10 uses a known three-beam method or DPD method (heterodyne method) for the tracking servo control, and uses a know knife-edge method or astigmatism method for the focussing servo control. From this reason, the photodetector 150M is divided into four photodetectors 150 (A to D).

Figure 11A:
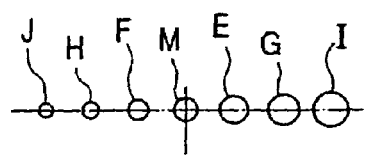
FIGS. 11A to 11C are diagrams illustrating a focussing state of each spot.
Figure 11B:
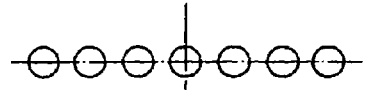
Figure 11C:
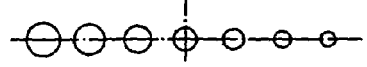

FIGS. 11A to 11C illustrate the focus state of each spot (I to J). As already described with FIG. 8, the distance between the pit surface 136 to the circle 146 is not the same in the spot column direction and changes. If the second axial line 122 is generally perpendicular to the pit surface 136, the distances between the opposite end spots I and J among the spots (I to J) and the circle 146 are generally equal and the sizes of the spots (I to J) are generally equal as shown in FIG. 11B and the focus state of each spot (I to J) is balanced. In contrast, if the second axial line 122 becomes oblique relative to the pit surface 136, the distances between the opposite end spots I and J among the spots (I to J) and the circle 146 become different and the sizes of the spots (I to J) become different as shown in FIG. 11A or 11C and the focus state of each spot (I to J) is unbalanced.

A relation between a displacement of the triangular prism 118 and a motion direction of the spots on the pit surface 136 is as follows. The +/− directions of the D1 direction correspond to the +/− directions of the x-direction, and the +/− directions of the D2 direction correspond to the +/− directions of the x-direction. The +/− directions of the R1 direction correspond to the +/− directions of the x-direction, and the +/− directions of the R2 direction correspond to the +/− directions of the y-direction. The motion along these directions is used for adjusting the balance of the focus state of each spot (I to J). The +/− directions of the R3 direction correspond to the directions moving away from the origin (+/−0) of the x-y coordinate system along the straight lines of y=−x and y=x. By moving the triangular prism 118 in the D1 and/or D2 direction, the spots (I to J) can be entered into an effective area 144 (an area of the pit surface 136 in which spots capable of reading data are reliably entered). By moving the triangular prism 118 in the R1, R2 and/or R3 direction, the spots (I to J) can be entered reliably in the effective area 144 and as shown in FIG. 11B the size of each spot (I to J) can be made generally equal and the focus state of each spot (I to J) can be balanced.

Figure 13:
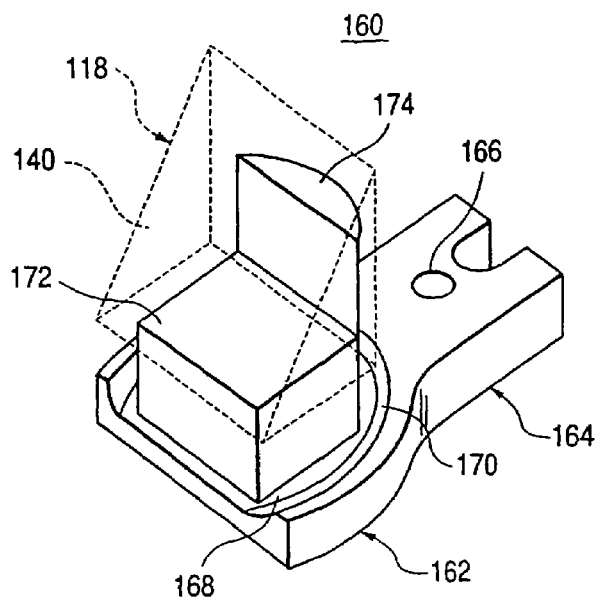
FIG. 13 is a perspective view of a prism holder.

FIG. 13 is a perspective view of a prism holder 160. The prism holder 160 has a bow portion 160 and a handle portion 164 protruding from the bow portion 162 on the arc side thereof. An idle hole 166 is formed through the handle portion 164 over the whole thickness. The bow portion 162 has a lower area 168 extending from the peripheral inner edge of the bow portion 162 lower to the central area via a concave side spherical portion 170. A seat 172 is fixed to the lower area 168 and has a predetermined height from the lower area 168 and an upper seat surface. An upright back 174 projects from the edge of the seat 172 on the handle portion 164 side. The triangular prism 118 is placed on the upper seat surface of the seat 172 with its right angle corner being abutted on the right angle corner between the seat 172 and upright back 174. The distance between the bottom surfaces of the triangular prism 118 is slightly wider than the width of the upper seat surface of the seat 172, so that the prism 118 protrudes in the width direction from the seat 172. Adhesive is dropped to the right angle corner between the portion of the triangular prism 118 protruded from the upper seat surface of the seat 172 and the upright side surface of the seat 172. As the adhesive is dried, the triangular prism 118 is fixed to the upper seat surface of the seat 172. Although the triangular prism 118 is fixed to the seat 172 by using adhesive, it is possible to prevent the triangular prism 118 from being raised by a thickness of the adhesive. The sphere center of the concave side spherical portion 170 is positioned on the reflection surface 140 of the triangular prism 118.

Figure 14A:
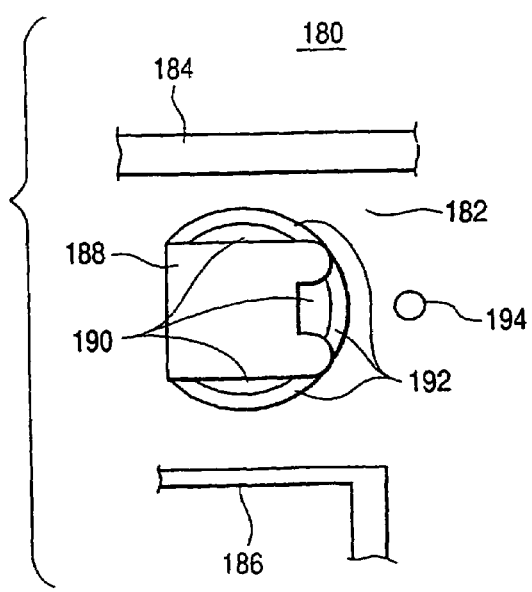
FIG. 14A is an outside view of a chassis before the prism holder is mounted.
Figure 14B:
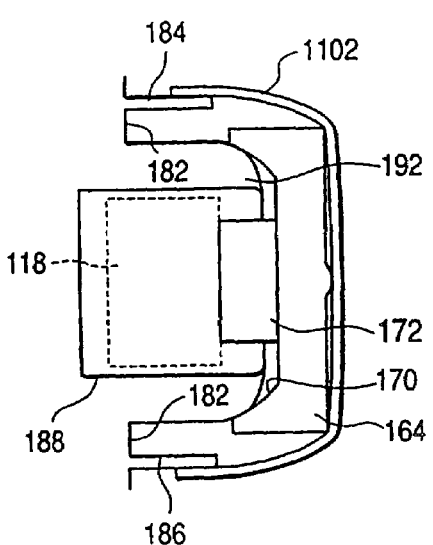
FIG. 14B is a schematic side view of FIG. 14A with a triangular prism being set.

FIG. 14A is the outer view of the chassis 180 before the prism holder 160 is mounted thereon. The optical elements such as the objective lens 126 are mounted on the inner surface of the chassis 180, i.e., on the back surface of the drawing sheet. Projections 184 and 186 extend in parallel and are higher than a flat region 182. A drop-in hole 188 is formed in this flat region 182 so that the triangular prism 118, seat 172 and upright back 174 of the prism holder 160 can be dropped into this hole 168 toward the inner surface of the chassis 180. A projected flat region 190 projected from the flat region 182 along the spherical portion 192 is sufficiently lower than the projections 184. The projected flat region 190 constitutes a portion of one circular flat region. A convex side spherical portion 192 has the same radius as the concave side spherical portion 170 shown in FIG. 13, and can be spherically engaged with the latter. A screw hole 194 is formed at the position corresponding to the idle hole 166 (FIG. 13) of the prism holder 160 and being apart from the concave side spherical portion 192. FIG. 14B shows the prism holder 160 shown in FIG. 13 mounted on the chassis as viewed laterally in FIG. 14A.

Figure 15:
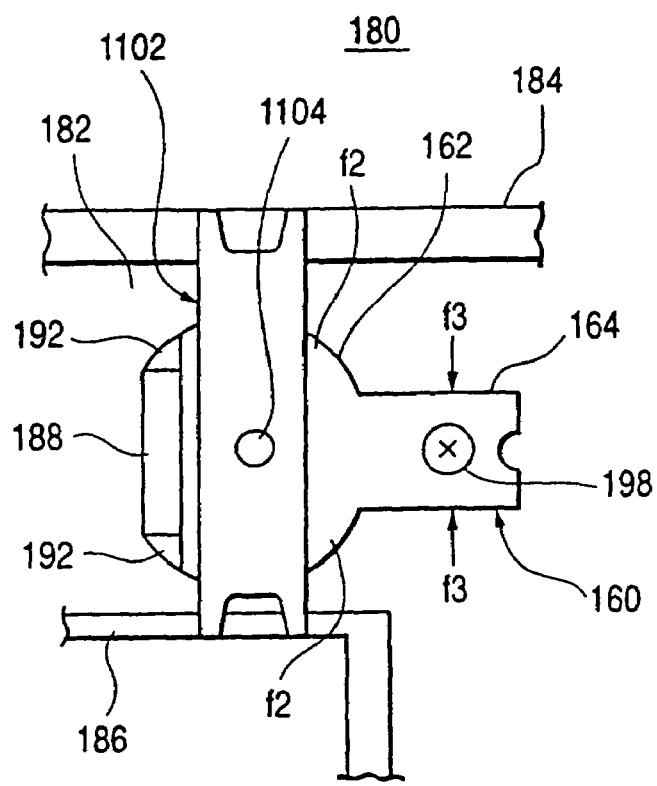
FIG. 15 is an outside view of the chassis after the prism holder is mounted.

FIG. 15 is an outer view of the chassis 180 after the prism holder 160 is mounted. By turning the prism holder 160 shown in FIG. 13 upside down, the triangular prism 118, seat 172 and upright back 174 are dropped in the drop-in hole 188 shown in FIG. 14, and the prism holder 160 is preliminarily mounted on the chassis 180 with a screw 198 and a plate spring 1102. The opposite ends of the plate spring 1102 are detachably snap-engaged with the outer peripheral area of the projections 184 and 186. The plate spring 1102 is provided with a projection 1104 at the central area thereof. This projection 1104 abuts on the surface of the bow portion 162 to thereby press the prism holder 160 against the chassis 180 by a predetermined force.

Figure 16:
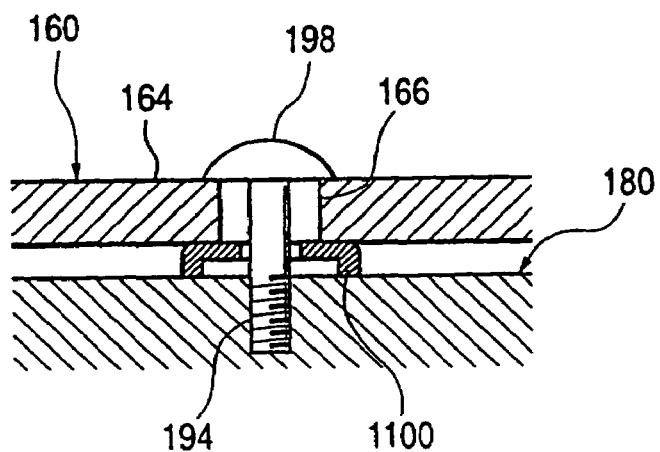
FIG. 16 is a cross sectional view of the prism holder after it is preliminarily mounted with screws.

FIG. 16 is a cross sectional view showing a preliminary mount state of the prism holder 160 by using the screw 198. The idle hole 166 has a diameter larger than that of the shaft of the screw 198. The head of the screw 198 abuts on the surface of the handle portion 164, and the shaft thereof is inserted into the idle hole 166 and a washer 1100. The screw 198 is thereafter threaded into the screw hole 194. The prism holder 160 is movable relative to the chassis 180 in the radial direction of the shaft of the screw 198 by an amount corresponding to a difference between the diameter of the shaft of the screw 198 and the diameter of the idle hole 166.

Reverting to FIG. 15, a relation between the pivotal motion of the triangular prism 118 in the R1 (FIG. 3), R2 (FIG. 4) and R3 (FIG. 5) directions and the motion of the prism holder 160 on the outer surface side of the chassis 180 will be described. As the threading amount of the screw 198 is changed, the compression amount of the washer 1100 (FIG. 16) changes so that the distance between the handle portion 164 and the chassis 180 near at the screw 198 changes. Therefore, the concave side spherical portion 170 of the prism holder 160 pivots in the R1 direction relative to the convex side spherical portion 192 of the chassis 180. In the mount state of the prism holder 160 on the chassis 180, the sphere centers of the concave side spherical portion 170 and convex side spherical portion 192 are both the reference point 138 (FIG. 3). Portions f1 and f2 of the bow portion 162 are positioned on both sides of the center line of the prism holder 160. As one portion f1 is pressed toward the flat region 182 (in the direction from the front to the back of the drawing sheet), this portion f1 sinks lower toward the flat region 182 whereas the other portion f1 floats higher away from the flat region 182. As a result, the concave spherical portion 170 of the prism holder 160 slides along the R2 direction relative to the convex side spherical portion 192 of the chassis 180. Portions f3 and f4 of the handle portion 164 are positioned on both sides of the center line of the prism holder 160. As one portion f3 is pressed toward the center line of the prism holder 160, this portion f3 moves near to the center line of the prism holder 160 whereas the other portion f3 moves away from the center line of the prism holder 160. As a result, the concave spherical portion 170 of the prism holder 160 slides along the R3 direction relative to the convex side spherical portion 192 of the chassis 180. A predetermined coupling force is maintained between the concave spherical portion 170 of the prism holder 160 and the convex side spherical portion 192 of the chassis 180, because the projection 1104 of the plate spring 1102 presses the prism holder 160 toward the chassis 180. Therefore, because of this coupling force, the relative rotation position between the concave spherical portion 170 and convex side spherical portion 192 is maintained unchanged even after the operation of the portions f3 is stopped.

During the manufacture processes of the optical pickup apparatus 110, a CCD is placed at the position corresponding to the pit surface 136, being replaced by the optical disc (FIG. 12), and an image corresponding to FIG. 7 is displayed on the screen. While this screen is monitored during the manufacture processes, the rotation position of the triangular prism 118 is changed in the R1, R2 and R3 directions through the adjustment of the threading amount of the screw 198 and the pressing operation of the portions f2 and f3 so that all the spots (I to J) are entered in the effective area 144 as shown in FIG. 5 and so that the size of each spot (I to J) becomes generally equal as shown in FIG. 11B. These operations realize the preliminary mount of the prism holder 160 on the chassis 180. At a proper timing after the preliminary mount, adhesive is dropped to predetermined areas between the prism holder 160 and chassis 180 to finally mount the prism holder 160 on the chassis 180. After this final mount, the screw 198 and plate spring 1102 may be dismounted.

Figure 17:
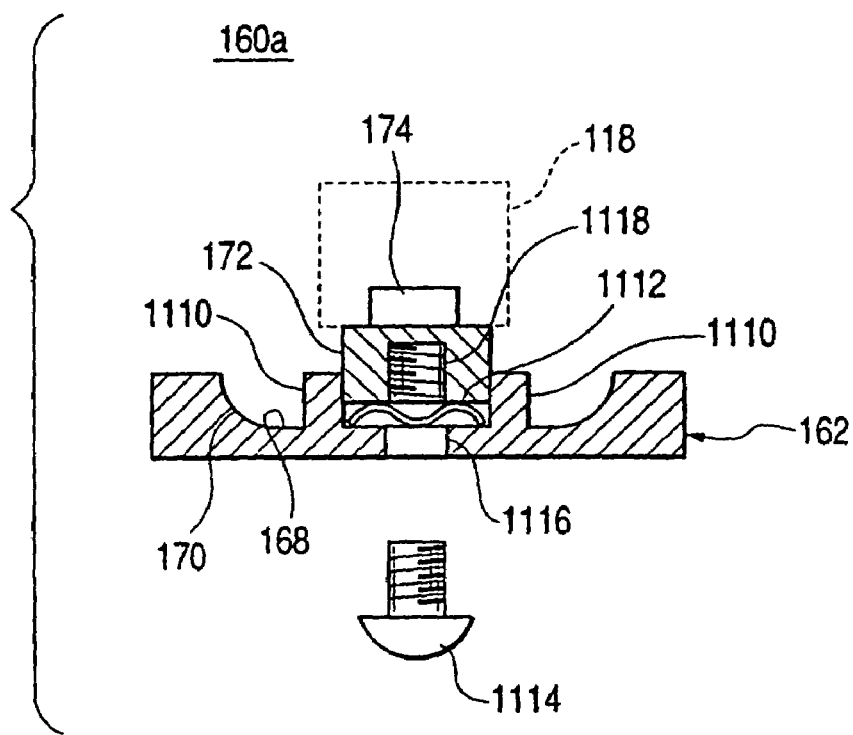
FIG. 17 is a diagram showing the structure of another prism holder.

FIG. 17 shows the structure of another prism holder 160a. A pair of rotation stopping and guide portions 1110 is raised in parallel from a lower area 168. A seat 172 and an upright back 174 are discrete from a bow portion 162. Both sides of the seat 172 having generally a square shape as viewed from the top are fitted in between the rotation stopping and guide port-ions 1110 while being guided thereby in a vertical direction. A washer 1112 is interposed between the lower area 168 and the seat 172. A screw 1114 is inserted into a hole 1116 formed in the bottom wall of the bow portion 162 and into the washer 1112, and threaded into a screw hole 1118 formed in the seat 172. As the threading amount of the screw 1114 into the screw hole 1118 is changed, the compression amount of the washer 1112 changes so that the triangular prism 118 moves along the D2 direction shown in FIG. 3. During the manufacture processes, while the image of the spots (I to J) picked up with CCD is monitored, the position of the triangular prism 118 along the D2 direction is adjusted so as to allow all the spots (I to J) to enter into the effective area 144 as shown in FIG. 7.

With the prism holder 160 and chassis 180 shown in FIGS. 13 to 15, the position of the triangular prism 118 along the R1, R2 and R3 directions is adjusted and the position along the D1 direction is not adjusted. If the position along the D1 direction is to be adjusted, the seat 172 and upright back 174 are made discrete from the prism holder 160, such as shown in FIG. 17. In this case, the seat 172 and upright back 174 are disposed, movably in the D1 direction, on the chassis 180 at a predetermined position near the upright back 174 on the inner surface side of the chassis 180. A screw is inserted into a hole in the upright back and into a washer, and threaded into a screw hole in the seat 172. As the screw is rotated, the threading amount of the screw into the screw hole in the seat 172 changes (the seat 172 is prevented from being rotated by the threading of the screw, by a predetermined rotation stopper) so that the position of the triangular prism 118 along the D1 direction changes.

FIGS. 18 to 21 show other light reflection optical elements to be used in place of the triangular prism 118.

Figure 18:
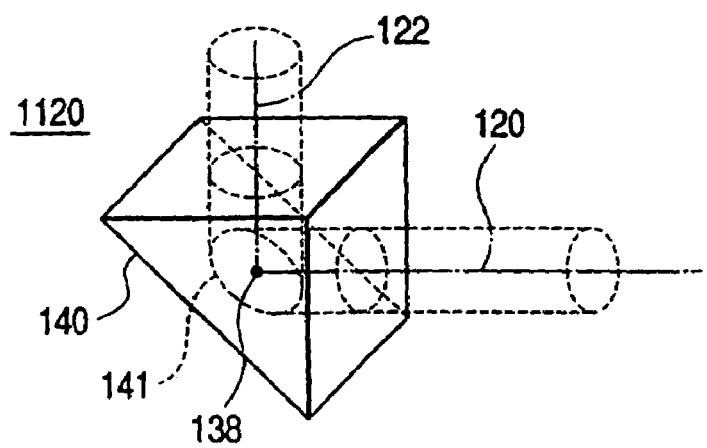
FIG. 18 is a diagram showing a first light reflecting optical element used as a triangular prism.
Figure 19:
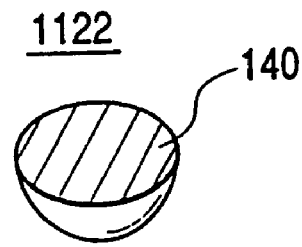
FIG. 19 is a diagram showing a second light reflecting optical element used as a triangular prism.
Figure 20:
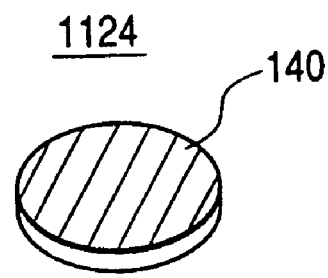
FIG. 20 is a diagram showing a third light reflecting optical element used as a triangular prism.
Figure 21:
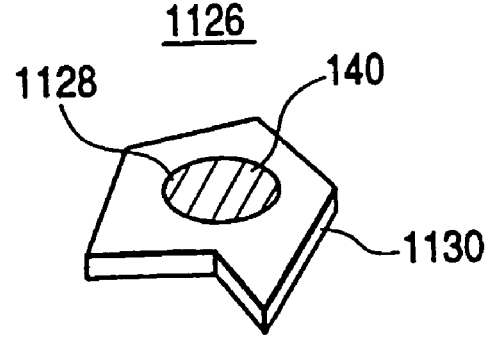
FIG. 21 is a diagram showing a fourth light reflecting optical element used as a triangular prism.

In an inner surface reflection type prism 1120 shown in FIG. 18, a light beam entered the prism 1120 is reflected by a reflection surface 140 in the prism 1120. A semi-sphere mirror 1122 (FIG. 19) and a circular disc mirror 1124 (FIG. 20) each have a circular reflection surface 140. A mirror unit 1126 (FIG. 21) has a mirror 1128 with a reflection surface 140 fitted in a flat plate holder 1130.

Figure 22:
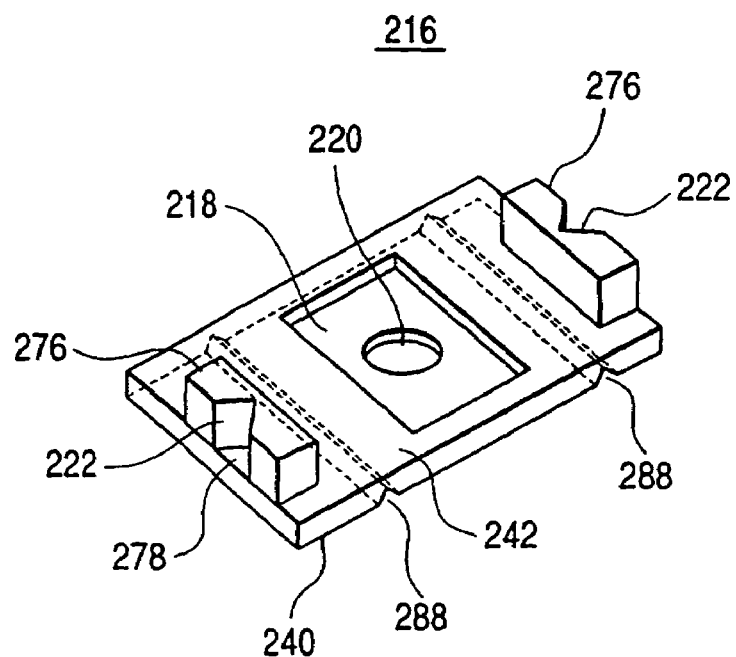
FIG. 22 is a perspective view of a holder of a first embodiment.
Figure 23:
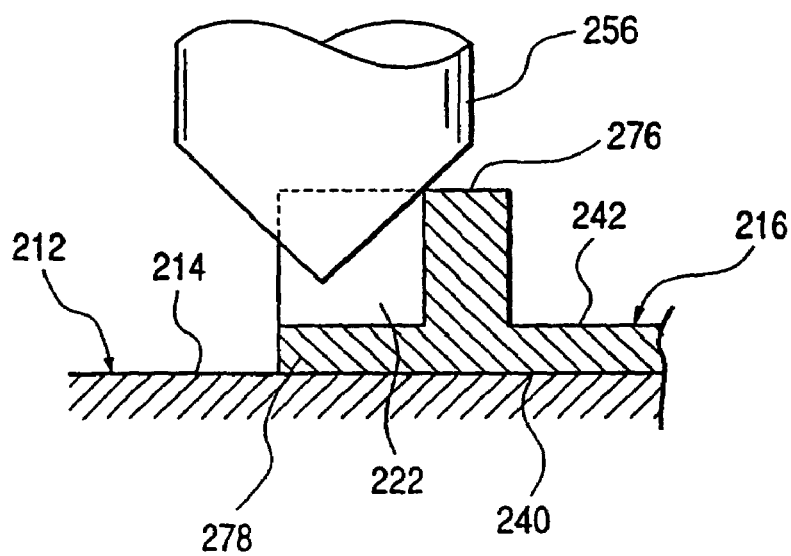
FIG. 23 is a cross sectional view illustrating an adhesion state of preliminarily mounting a holder on a base.
Figure 28:
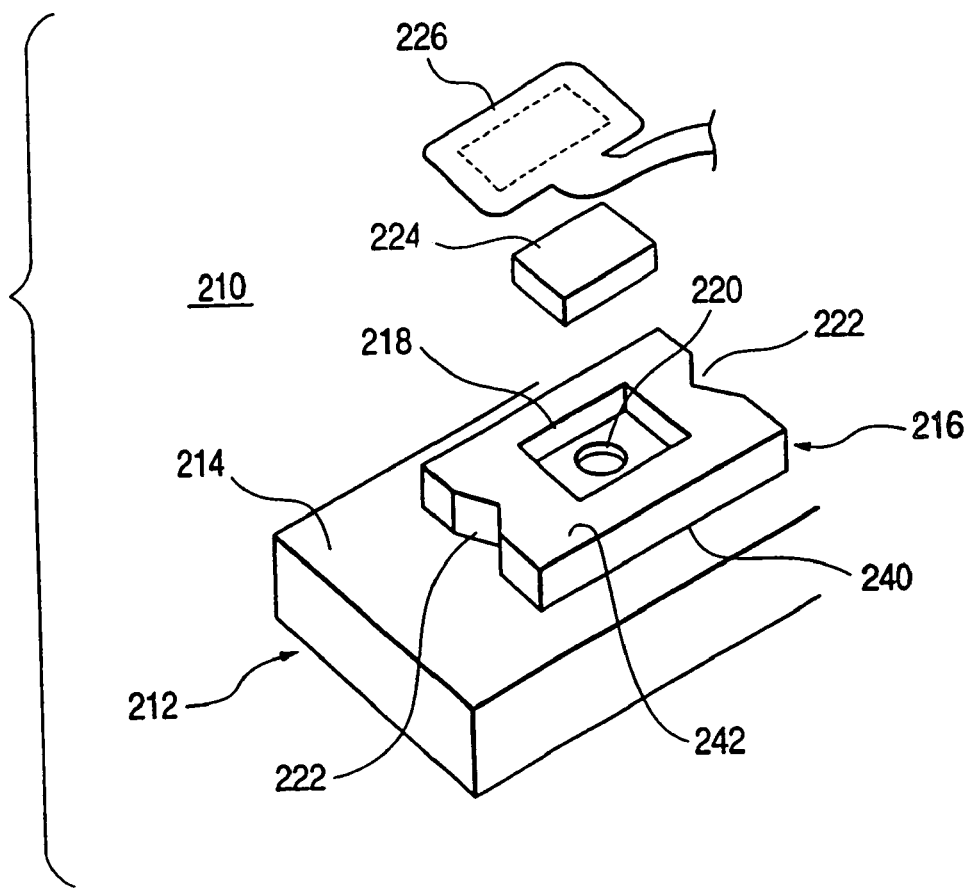
FIG. 28 is a diagram showing a conventional holder mounted on a base of an optical pickup apparatus.
Figure 29:
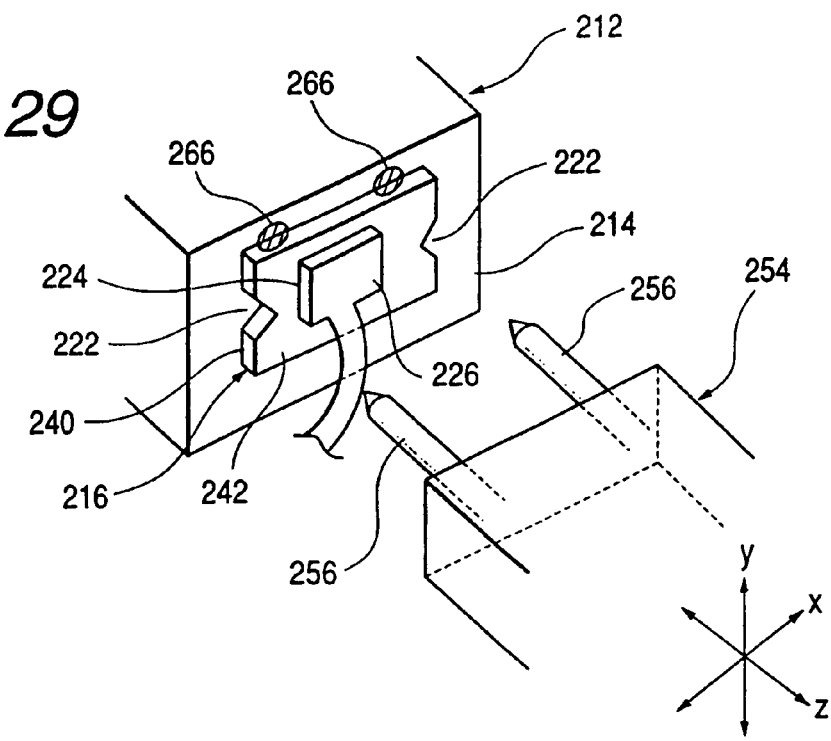
FIG. 29 is a diagram illustrating a process of preliminarily mounting a conventional holder on a base.

FIG. 22 is a perspective view of a holder 216 of a first embodiment, and FIG. 23 is a cross sectional view illustrating a preliminary mount of the holder 216 on a base 212. Different points of this embodiment from the holder shown in FIG. 28 will be described. A pair of projections 276 is formed at right and left side edges on a non-bonding surface 242 side and projected upward from the non-bonding surface 242. Each projection 276 is formed with a pin fitting V-groove 222 with a bottom wall 278 constituted of the non-bonding surface 242 in this groove area. The bottom wall 278 covers the pin fitting V-groove 222 on the holder mount surface 214 side. The bottom wall 278 is flush with a bonding surface 240 on the bonding surface 240 side, and is flush with the non-bonding surface 242 on the pin fitting V-groove 242 side. A pair of instant adhesive guide V-grooves 288 is formed on the bottom surface of the holder 216 in an area inside of the projections 276, the guide V-grooves being parallel to the shorter side of the holder 216. One ends of the instant adhesive guide V-grooves are positioned at the instant adhesive dropping areas 266 (FIG. 29). A tapered sharp end of an adjusting pin 256 abuts on the side edge of the pin fitting V-groove 222 so that the pin is prevented from entering further into the V-groove 222.

During the preliminary mount, the instant adhesive 270 (FIG. 29) dropped to the instant adhesive dropping areas 266 (FIG. 29) flows into a space between the holder mount surface 214 of the base 212 and the bonding surface 240 of the holder 216 and reaches an area near the pin fitting V-grooves 222. However, even if the adhesive reaches the area near the pin-fitting V-grooves 222, it is intercepted by the bottom wall 278 and prevented from invading into the V-groves 222. Furthermore, the instant adhesive 270 in the instant adhesive dropping areas 266 is guided by the instant adhesive guide V-grooves 288 to the opposite longer side of the holder 216, so that the amount of the instant adhesive 270 flowing toward the pin fitting V-grooves 222 can be reduced. It is therefore possible to prevent the adjusting pin 256 in the pin fitting V-groove 222 from attaching the instant adhesive 270 and from being fixed to the V-groove 222. At the process next to the process of dropping the instant adhesive 270, the adjusting pin 256 is pulled out of the V-groove 222 without such a problem as the preliminarily mounted holder 216 is peeled off from the base 212.

Figure 30:
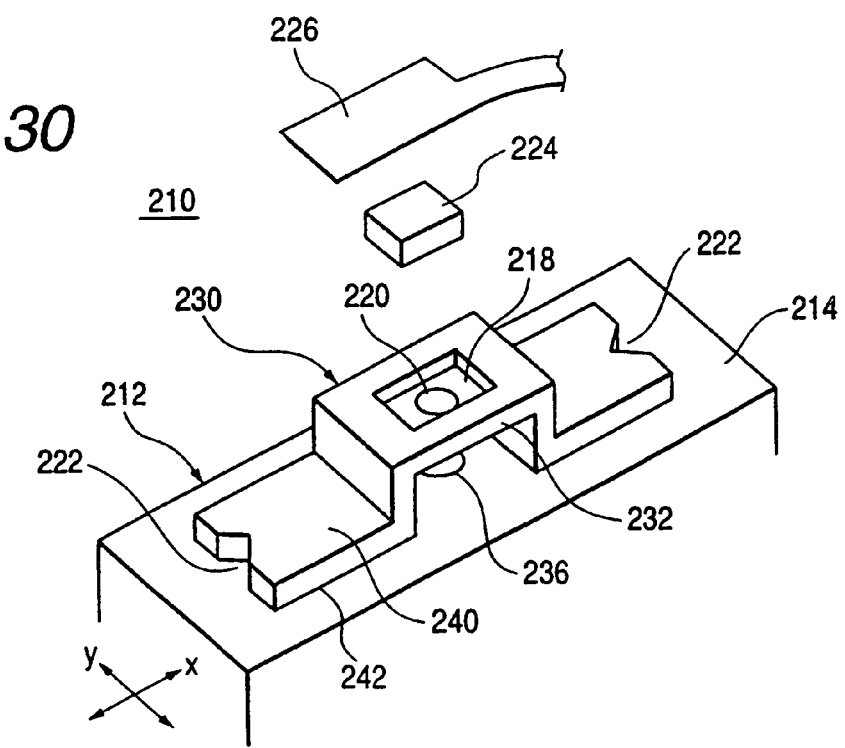
FIG. 30 is a diagram showing another conventional holder mounted on a base of an optical pickup apparatus.
Figure 31:
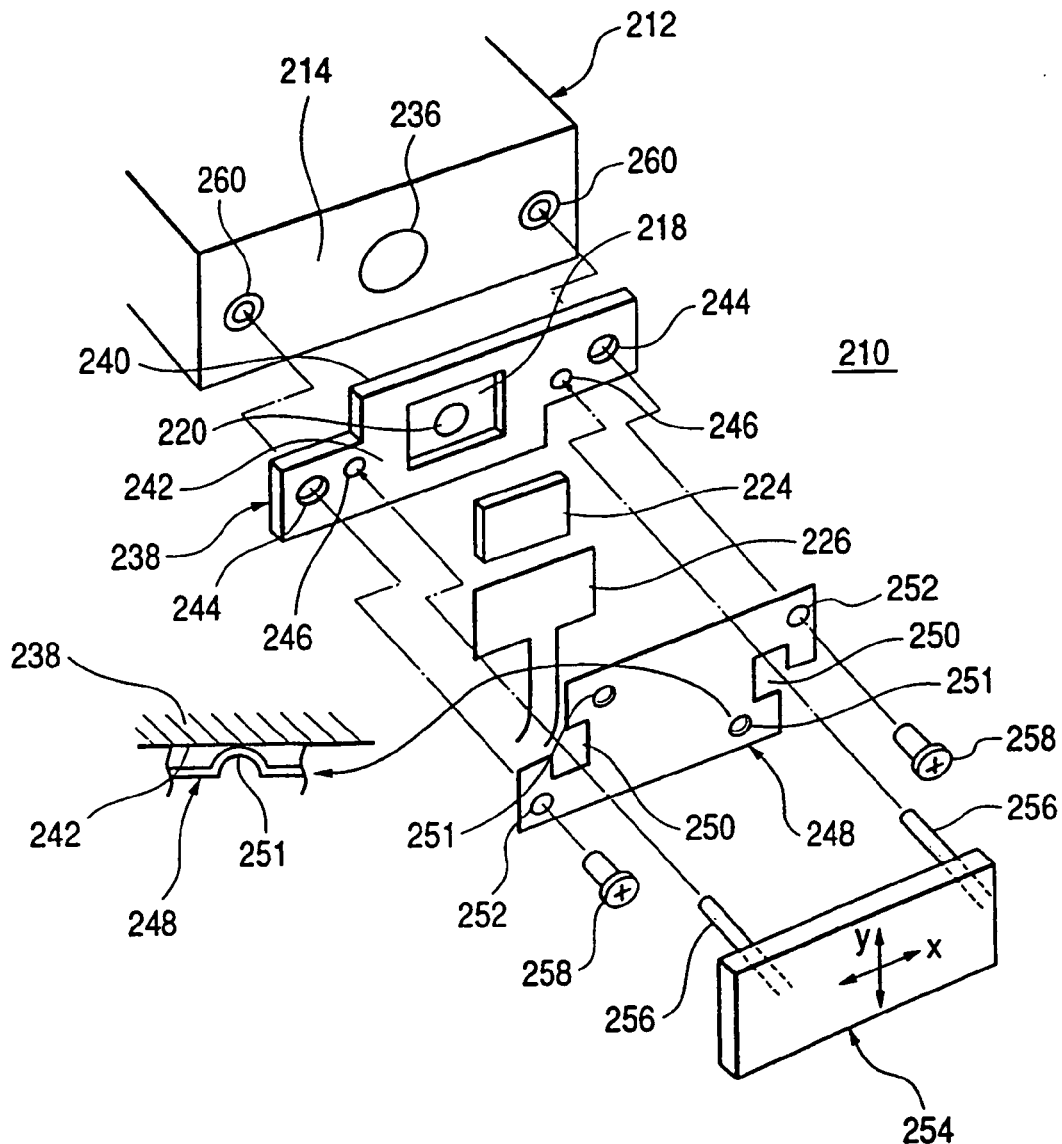
FIG. 31 is a diagram showing another conventional holder mounted on a base of an optical pickup apparatus.
Figure 32:
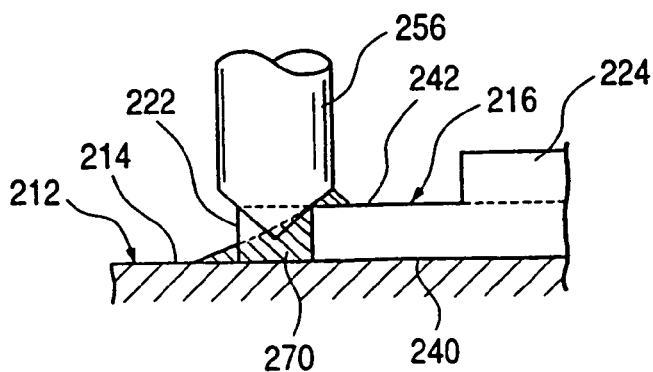
FIG. 32 is a diagram illustrating an invasion of instant adhesive into a pin fitting V-groove immediately after the holder shown in FIG. 28 is preliminarily mounted.

The pin fitting V-groove 222 of the holder 230 (FIG. 30) and the pin hole 246 of the holder 238 (FIG. 31) may be provided with the projection 276 shown in FIG. 22 and with the pin fitting V-groove 22 having the bottom wall 278, with similar advantages as above being expected.

Figure 24:
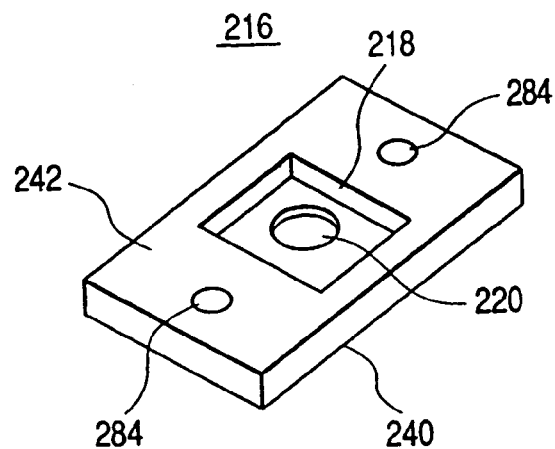
FIG. 24 is a perspective view of a holder of a second embodiment.
Figure 25:
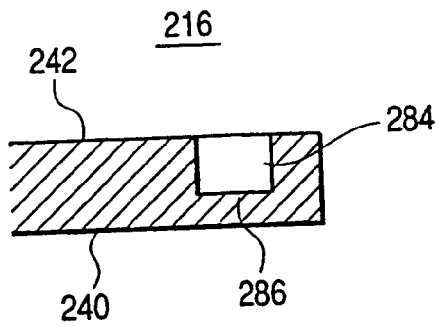
FIG. 25 is a vertical cross sectional view of the holder of FIG. 24 near pin holes.

FIG. 24 is a perspective view of a holder 216 of the second embodiment, and FIG. 25 is a vertical cross sectional view showing the structure near a pin hole 284 of the holder 216 shown in FIG. 24. With this holder 216, the projections 276 of the holder 216 shown in FIG. 22 are omitted. A circular pin hole 284 are formed through the holder 216 at the positions near right and left shorter sides. The tapered sharp end of the adjusting pin 256 is partially inserted into this pin hole 284. A sealing portion 286 seals the pin hole 284 on the bonding surface 240 side, and is flush with the bonding surface 240 on the bonding surface 240 side. Since the pin hole 284 is sealed by the sealing portion 286 on the bonding surface 240 side, it is possible to prevent the instant adhesive 270 from invading into the pin hole 284 and attaching to the adjusting pin 256, during the preliminary mount.

The pin fitting V-groove 222 of the holder 230 (FIG. 30) and the pin hole 246 of the holder 238 (FIG. 31) may be provided with the sealing portion 286 of the holder 216 shown in FIGS. 24 and 25 to seal the V-groove 222 and pin hole 246 formed through the whole thickness, on the bonding surface 240 side, with similar advantages as above being expected.

Figure 26:
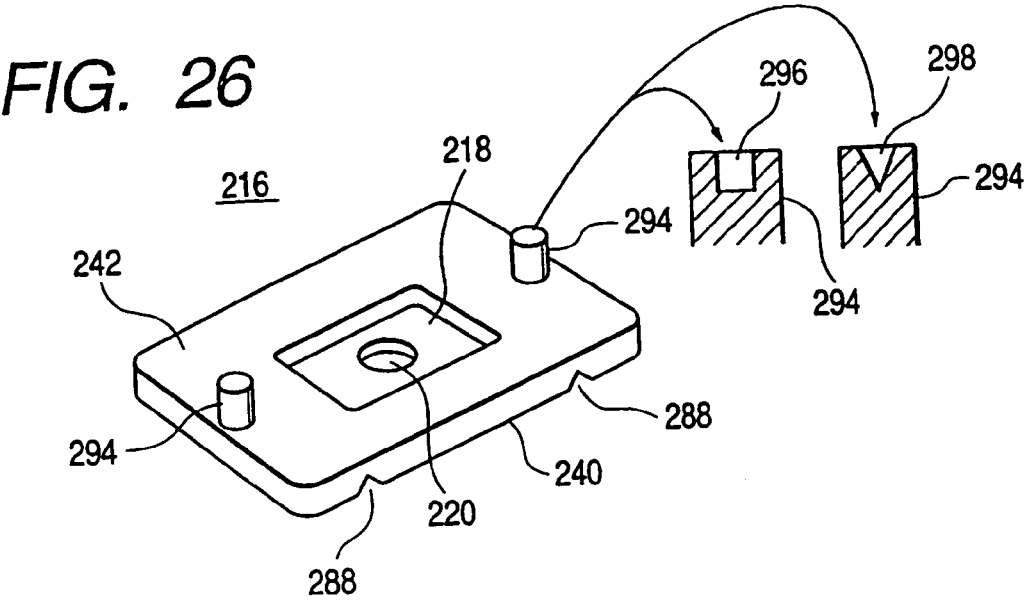
FIG. 26 is a perspective view of a holder of a third embodiment, with cross sectional views of its cylindrical projection.

FIG. 26 shows a holder 216 of a third embodiment, with vertical cross sectional views of a cylindrical projection 294. Each cylindrical projection 294 is formed at the position corresponding to the pin fitting V-groove 222 shown in FIG. 22, and projects from a non-bonding surface 242 by a predetermined amount along the thickness direction of the holder 216. A cylindrical hole 296 or a conical hole 298 opening at the top surface of the cylindrical projection 294 is formed. The tapered sharp end of the adjusting pin 256 is inserted into this hole. The taper angle of the conical hole 298 is made equal to the taper angle of the tapered sharp end of the adjusting pin 256 so that the tip of the adjusting pin 256 is nearly in tight contact with the conical hole 298.

The holder 230 (FIG. 30) and the holder 238 (FIG. 31) may be provided with the cylindrical projections 294 with the cylindrical holes 296 or conical holes 298 similar to those shown in FIG. 26 to replace the pin fitting V-grooves 222 and pin holes 246 by the cylindrical holes 296 or conical holes 298, with similar advantages as above being expected.

Figure 27:
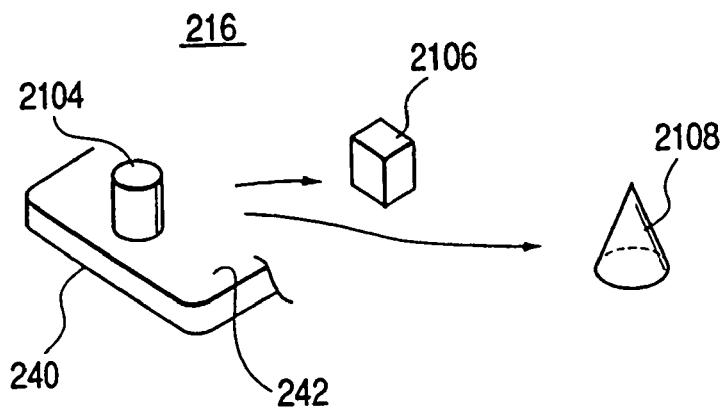
FIG. 27 is a perspective view of a holder of a fourth embodiment, with two modifications of the cylindrical projection.

FIG. 27 shows a holder 216 of a fourth embodiment, with two modifications of a cylindrical projection 2104. The cylindrical projection 2104 is formed at the same position as the cylindrical projection 294 shown in FIG. 26, and projects from a non-bonding surface 242 in the direction opposite to the base 212 by a predetermined amount. An adjusting pin 26 used for this holder 216 is made to have an engaging hole at the tip thereof. The cylindrical projection 210 is inserted into this engaging hole of the adjusting pin 256 to move the holder 2116 relative to the base 212. Instead of the cylindrical projection 2104, various shapes may be used such as a cubic projection 2106 and a pyramidal projection 2108. The engaging hole of the adjusting pin 256 is formed to have a corresponding shape.

The pin fitting V-groove 222 of the holder 230 (FIG. 30) and the pin hole 246 of the holder 238 (FIG. 31) may be provided with the cylindrical projection 2104, cubic projection 2106 or pyramidal projection 2108 similar to that shown in FIG. 27, and the engaging hole of the adjusting pin 256 is formed to have a corresponding shape, with similar advantages as above being expected.

The invention claimed is:

1. An optical pickup apparatus which serves to focus the spots (M, E, F, G, H, I and J) lining up in a single file of a plurality N of light beams onto a plurality N of adjacent tracks of a recording medium (34) and detect a plurality N of reflected lights from said tracks, whereby simultaneously reading out a plurality N of pieces of data recorded on said tracks, where N is an integer more than two, said apparatus comprising:

(a) objective spot forming means (30) for forming each spot (M, E, F, G, H, I, and J) of said plurality of light beams entered via a collimator (28), on each track of said recording medium (34);

(b) a plurality N of adjacent photodetectors (52M, 52E, 52F, 52G, 52H, 52I, and 52J) lining up in a single file, each provided for each spot (M to J) for receiving reflected light of each spot (M to J), the reflected light having passed through said objective spot forming means (30), said collimator (28), and focus adjusting means (50) in this order; and (c) a chassis (70) mounted with said collimator (28), wherein said focus adjusting means (50) and said series of adjacent photodetectors (52M to 52J) are supported respectively by a focus adjusting means support member (72) and a photodetector support member (78) formed separately from said chassis (70), and the focus adjusting means support member (72) and the photodetector support member (78) are movable along a direction of an optical axis (66), and these members (72, 78) are fixed to said chassis at positions along an optical axis, the positions being visually confirmed that the reflected light of each spot (M to J) becomes incident upon a corresponding one of said photodetectors (52M to 52J).

2. An optical pickup apparatus according to claim 1, wherein the plurality of light beams are generated by making light from a light source (14) pass through a diffraction grating (20).

3. An optical pickup apparatus according to claim 1, wherein at least one of said series of adjacent photodetectors (52M to 52J) includes a plurality of light reception areas for divisionally receiving one light beam.

4. An optical pickup apparatus according to claim 1, wherein an optical axis (32) of the reflected light passing through the collimator is changed to an optical axis (66) toward said focus adjusting means (50) by a beam splitter (24) upon which the reflected light passed through the collimator becomes incident.

5. An optical pickup apparatus according to claim 4, wherein the reflected light incident upon each photodetector is visually confirmed by detecting means (CCD).

6. An optical pickup apparatus according to claim 5, wherein said detecting means is disposed on an opposite side of the beam splitter (24) relative to said focus adjusting means (50).

7. An optical pickup apparatus according to claim 1, wherein said focus adjusting means is made movable between the beam splitter and said photodetectors.

8. An optical pickup apparatus according to claim 7, wherein said focus adjusting means is moved by being slid on said chassis.

9. An optical pickup apparatus according to claim 7, wherein a distance (y) between a plane (68) on which said photodetectors are disposed and said focus adjusting means and a distance (x) between the plane and the beam splitter are maintained to have a predetermined relation (y=ax+b where a and b are constants), and said focus adjusting means is made movable between the beam splitter and said photodetectors.

10. An optical pickup apparatus which serves to focus the spots (M, E, F, G, H, I and J) lining up in a single file of a plurality N of light beams onto a plurality N of adjacent tracks of a recording medium (34) and detect a plurality N of reflected lights from said tracks, whereby simultaneously reading out a plurality N of pieces of data recorded on said tracks, where N is an integer more than two, said apparatus comprising:
(a) objective spot forming means (30) for forming each spot (M, E, F, G, H, I, and J) of said plurality of light beams entered via a collimator (28), on each track of said recording medium (34);
(b) a plurality N of adjacent photodetectors (52M, 52E, 52F, 52G, 52H, 52I, and 52J) lining up in a single file, each provided for each spot (M to J) for receiving reflected light of each spot (M to J), the reflected light having passed through said objective spot forming means (30), said collimator (28), and focus adjusting means (50) in this order;
(c) a chassis (70) mounted with said collimator (28); and
(d) means (72, 78) for adjusting a distance between said focus adjusting means and said photodetectors, wherein said adjusting means includes a first member (72) for supporting said focus adjusting means and a second member (78) for supporting said photodetectors, the first member (72) and the second member (78) being movable along a direction of an optical axis (66) and fixed to said chassis (70), and the distance is adjusted by moving the first member along said second member.

11. An optical pickup apparatus which serves to focus the spots (M, E, F, G, H, I and J) lining up in a single file of a plurality N of light beams onto a plurality N of adjacent tracks of a recording medium (128) and detect a plurality N of reflected lights from said tracks, whereby simultaneously reading out a plurality N of pieces of data recorded on said tracks, where N is an integer more than two, said apparatus comprising:
(a) a light reflection optical element (118, 1120, 1122, 1124, 1126) for reflecting said plurality of light beams incoming along a direction of a first axial line (120), toward a direction of a second axial line (122) different from the first axial line, said light reflection optical element being attached rotatably around each of the first and second axial lines (120, 122);
(b) spot forming means (126) for forming a plurality of spatially separated spots (M, E, F, G, H, I, and J) of each light beam incoming along the direction of the second axial line (122) from said light reflection optical element (118, 1120, 1122, 1124, 1126), on each track (142) of said recording medium (128);
(c) support means (170, 182) for rotatably supporting said light reflection optical element (118, 1120, 1122, 1124, 1126) about at least one rotation axial line on a chassis (180), the rotation axial line passing a reference point (138) which is a cross point between the first and second axial lines (120, 122);
(d) fixing means (198, 1102) for fixing said light reflection optical element (118, 1120, 1122, 1124, 1126) to the chassis (180), whose rotational position has been adjusted so that the focus states of said plurality of spots (M, E, F, G, H, I, and J) are substantially equal; and
(e) reflected light detecting means (134) for detecting reflected light of each spot (M to J) passed through said spot forming means (126).

12. An optical pickup apparatus according to claim 11, wherein the rotation axial line includes a rotation axial line perpendicular to both the first axial line (120) and the second axial line (122).

13. An optical pickup apparatus according to claim 11, wherein the rotation axial line includes a rotation axial line coincident with the first axial line (120).

14. An optical pickup apparatus according to claim 11, wherein the rotation axial line includes a rotation axial line coincident with the second axial line (122).

15. An optical pickup apparatus according to claim 11, wherein said support means (170, 192) includes a spherical fitting portion (170, 192).

16. An optical pickup apparatus according to claim 11, wherein said light reflection optical element is a triangular prism (118).

17. An optical pickup apparatus according to claim 16, wherein said light reflection optical element is an inner surface reflection type triangular prism (1120), and the light beam is reflected by a reflection surface (140).

18. An optical pickup apparatus according to claim 11, wherein said light reflection optical element is a semispheric mirror (1122).

19. An optical pickup apparatus according to claim 11, wherein said light reflection optical element is a circular disc mirror (1124).

20. An optical pickup apparatus according to claim 11, wherein said support means includes a concave spherical portion (170) and a convex spherical portion (192) which can be spherically fitted together.

21. An optical pickup apparatus according to claim 20, wherein said light reflection optical element is held by holding means (160) partially constituting said support means, said fixing means is a screw (198), said holding means is fixed to the chassis by the screw via a washer, and a height of the washer is changed with a threading amount of the screw to thereby tightly fit together the concave spherical portion and the convex spherical portion.

22. An optical pickup apparatus according to claim 20, wherein said light reflection optical element is held via a mount member (172) by holding means (160a) partially constituting said support means, said mount member is fixed to said holding means by a screw (1114) via a washer (1112), a height of the washer is changed with a threading amount of the screw to thereby moving up and down said light reflection optical element.

23. An optical pickup apparatus according to claim 22, wherein said support means (110) regulate said mount member from being rotated during threading the screw, in a direction of threading the screw.

24. An optical pickup apparatus according to claim 11, wherein said light reflection optical element is held by holding means (160) partially constituting said support means, said fixing means is a screw (198), said holding means is fixed to the chassis by the screw, a screw hole of the chassis has a diameter larger than a diameter of a shaft of the screw, and said light reflection optical element can be displaced along the chassis by an amount corresponding to a difference between the diameters.

25. An optical pickup apparatus which serves to focus the spots (M, E, F, G, H, I and J) lining up in a single file of a plurality N of light beams onto a plurality N of adjacent tracks of a recording medium (128) and detect a plurality N of reflected lights from said tracks, whereby simultaneously reading out a plurality N of pieces of data recorded on said tracks, where N is an integer more than two said apparatus comprising:

(a) a light reflection optical element (118, 1120, 1122, 1124, 1126) for reflecting said plurality of light beams incoming along a direction of a first axial line (120), toward a direction of a second axial line (122) different from the first axial line, said light reflection optical element being attached rotatably around each of the first and second axial lines (120, 122);

(b) spot forming means (126) for forming a plurality of spatially separated spots (M, E, F, G, H, I, and J) of each light beam incoming along the direction of the second axial line (122) from said light reflection optical element (118, 1120, 1122, 1124, 1126), on each track (142) of said recording medium (128);

(c) support means (1110) for movably supporting said light reflection optical element (118, 1120, 1122, 1124, 1126) on the chassis along the direction of the first axial line (120) and/or the direction of the second axial line (122);

(d) fixing means (198, 1102) for fixing said light reflection optical element (118, 1120, 1122, 1124, 1126) to the chassis (180), whose positions to the directions of said first and second axial lines (120, 122) have been adjusted so that the focus states of said plurality of spots (M, E, F, G, H, I, and J) are substantially equal; and (e) reflected light detecting means (134) for detecting reflected light of each spot (M to J) passed through said spot forming means (126).

\* \* \* \* \*